United States Patent
Sakuta et al.

(10) Patent No.: US 9,325,651 B2
(45) Date of Patent: Apr. 26, 2016

(54) MESSAGE NOTIFYING DEVICE, CONTROL METHOD, AND STORAGE MEDIUM STORING CONTROL PROGRAM

(71) Applicant: SHARP KABUSHIKI KAISHA, Osaka-shi, Osaka (JP)

(72) Inventors: Makoto Sakuta, Osaka (JP); Takayuki Nagamatsu, Osaka (JP); Chie Hideishi, Osaka (JP); Yoshihisa Waki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 154 days.

(21) Appl. No.: 14/187,706

(22) Filed: Feb. 24, 2014

(65) Prior Publication Data
US 2014/0244769 A1 Aug. 28, 2014

(30) Foreign Application Priority Data

Feb. 25, 2013 (JP) ................................. 2013-034996

(51) Int. Cl.
*H04L 12/58* (2006.01)

(52) U.S. Cl.
CPC ............... *H04L 51/18* (2013.01); *H04L 51/24* (2013.01); *H04L 51/02* (2013.01)

(58) Field of Classification Search
None
See application file for complete search history.

(56) References Cited

U.S. PATENT DOCUMENTS

| | | | | |
|---|---|---|---|---|
| 6,493,703 B1* | 12/2002 | Knight | ............... | G06F 17/30702 |
| 6,571,234 B1* | 5/2003 | Knight | ................... | G06Q 10/10 |
| 7,159,011 B1* | 1/2007 | Knight | ............... | G06F 17/30864 |
| | | | | 707/999.003 |
| 8,255,090 B2* | 8/2012 | Frader-Thompson | . | G01D 4/002 |
| | | | | 700/295 |
| 2003/0217136 A1* | 11/2003 | Cho | ................... | H04L 12/2818 |
| | | | | 709/223 |
| 2005/0283731 A1* | 12/2005 | Saint-Hilaire | ...... | H04L 12/2803 |
| | | | | 715/733 |
| 2007/0100981 A1* | 5/2007 | Adamczyk | .............. | H04L 69/18 |
| | | | | 709/223 |
| 2008/0077650 A1* | 3/2008 | Jared | ................... | H04L 12/2809 |
| | | | | 709/203 |
| 2008/0162637 A1* | 7/2008 | Adamczyk | .......... | H04L 12/5815 |
| | | | | 709/204 |
| 2008/0177994 A1* | 7/2008 | Mayer | .................. | G06F 9/4418 |
| | | | | 713/2 |
| 2009/0125146 A1* | 5/2009 | Zhang | .................... | B25J 9/1664 |
| | | | | 700/253 |
| 2009/0309727 A1* | 12/2009 | Rice | ..................... | H04B 7/1851 |
| | | | | 340/568.1 |
| 2010/0115024 A1* | 5/2010 | Song | ................. | G06F 17/30887 |
| | | | | 709/203 |
| 2010/0115093 A1* | 5/2010 | Rice | ........................ | H04L 12/24 |
| | | | | 709/224 |
| 2010/0130176 A1* | 5/2010 | Wan | ....................... | G06Q 30/02 |
| | | | | 455/414.1 |
| 2011/0072506 A1* | 3/2011 | Law | .................... | H04L 63/1416 |
| | | | | 726/11 |
| 2011/0078231 A1* | 3/2011 | Oliver | .................. | G06F 9/5055 |
| | | | | 709/203 |
| 2012/0066088 A1* | 3/2012 | Murset | ................... | G06Q 10/06 |
| | | | | 705/26.8 |
| 2012/0072559 A1* | 3/2012 | Alzamil | ................ | G06Q 50/01 |
| | | | | 709/222 |
| 2012/0265370 A1* | 10/2012 | Kim | ..................... | G07C 5/0841 |
| | | | | 701/2 |

FOREIGN PATENT DOCUMENTS

| | | |
|---|---|---|
| JP | 2001-337827 A | 12/2001 |
| JP | 2005-092540 A | 4/2005 |
| JP | 2012-141713 A | 7/2012 |

* cited by examiner

*Primary Examiner* — Ninos Donabed
(74) *Attorney, Agent, or Firm* — Birch, Stewart, Kolasch & Birch, LLP

(57) ABSTRACT

An operation instruction detecting section detects an operation instruction from a message and specifies, as an instruction provider, a member who has posted the message. A report message displaying section causes a message, which (i) reports a result of an operation executed in accordance with the operation instruction and (ii) is explicitly directed to the instruction provider, to be displayed on a family message board.

9 Claims, 10 Drawing Sheets

| OPERATION INSTRUCTION IDENTIFIER | USER LIST |
|---|---|
| CM001 | U002, U003 |

FIG. 6

| OPERATION INSTRUCTION IDENTIFIER | OPERATION INSTRUCTION (NAME) |
|---|---|
| CM001 | PHOTOGRAPHING |
| CM002 | CLEANING |
| CM003 | OBTAINING TEMPERATURE |

FIG. 7

| OPERATION INSTRUCTION IDENTIFIER | APPARATUS CONTROL CODE |
|---|---|
| CM001 | GET_PICTURE |
| CM002 | CLEANING |
| CM003 | GET_TEMPERATURE |

FIG. 8

| IMAGE ID | OPERATION INSTRUCTION IDENTIFIER |
|---|---|
| SEAL_101 | CM001 |
| SEAL_102 | CM002 |
| SEAL_103 | CM003 |

FIG. 9

| OPERATION INSTRUCTION IDENTIFIER | MESSAGE TYPE | WORDING |
|---|---|---|
| CM001 | RP_START | [FIRST_POSTER], OK! |
| CM001 | RP_SUCCEEDED | [ALL_POSTERS], I TOOK A PHOTOGRAPH! |
| CM001 | RP_FAILED_1 | [ALL_POSTERS], PHOTOGRAPHING HAS BEEN FAILED! |
| CM002 | RP_START | [FIRST_POSTER], I WILL DO CLEANING! |
| CM002 | RP_SUCCEEDED | [ALL_POSTERS], CLEANING HAS BEEN FINISHED! |
| CM002 | RP_FAILED_1 | I CANNOT DO CLEANING ANYMORE BECAUSE TRASH IS FULL. [FIRST_POSTER], PLEASE THROW TRASH AWAY LATER. |
| CM003 | RC_SUCCEEDED | IT'S [RETURN_VAL]° C NOW. |
| CM003 | RC_FAILED_1 | NOW SLEEPING. TEMPERATURE CANNOT BE MEASURED. |
| CMXXX | RP_BUSY_1 | [LAST_POSTER], [CMD_NAME] IS NOW BEING EXECUTED BY REQUEST FROM [ALL_POSTER-LAST_POSTER]! JUST A MOMENT. |
| CMYYY | RP_BUSY_2 | [Now_POSTER], [CMD_NAME] IS NOW BEING EXECUTED BY REQUEST FROM [ALL_POSTER]! JUST A MOMENT. |

| USER IDENTIFIER | USER NAME |
|---|---|
| U001 | FATHER |
| U002 | MOTHER |
| U003 | TARO |

MESSAGE NOTIFYING DEVICE, CONTROL METHOD, AND STORAGE MEDIUM STORING CONTROL PROGRAM

This Nonprovisional application claims priority under 35 U.S.C. §119 on Patent Application No. 2013-034996 filed in Japan on Feb. 25, 2013, the entire contents of which is hereby incorporated by reference.

TECHNICAL FIELD

The present invention relates to a message notifying device, etc. which notifies a user of a message.

BACKGROUND ART

Conventionally, as a result of development of communication technologies and growing diversity of communication services, various kinds of electronic conversation tools have been widely used. The electronic conversation tools are, for example, electronic bulletin boards, chatting, weblog, short message posting sites (e.g., TWITTER (Registered Trademark)), and SNS (Social Networking Service). A user communicates with other users by conversing with them, organizing communities, and sending information by utilizing these conversation tools with the use of a communication device.

Moreover, development of artificial intelligent techniques has produced a technique of causing a computer (personified agent) to communicate with a human.

For example, Patent Literature 1 discloses an electronic communication device that supplies a service such as e-mail or an electronic bulletin board, which communicates with a user with the use of an agent such as an electronic virtual pet or a personified agent.

Patent Literature 2 discloses a technique of (i) extracting, from sentence data, a sentence whose sentence characteristic vector (sentence characteristic data), which is made up of the same number of numerical values as an individuality vector, is similar to the individuality vector in accordance with a conversational sentence entered by a user and (ii) generating, from the sentence thus extracted, a reply sentence to the conversational sentence.

Furthermore, there has been an attempt to operate a household electronic appliance by a natural language and to notify a user of an operation result by the natural language.

For example, Patent Literature 3 discloses a natural language conversing system in which (i) a service providing agent executes a service corresponding to an action instruction given by a user with the use of a natural language and (ii) an execution content is outputted to the user.

CITATION LIST

Patent Literatures

[Patent Literature 1]
  Japanese Patent Application Publication Tokukai No. 2005-92540 A (Publication date: Apr. 7, 2005)
[Patent Literature 2]
  Japanese Patent Application Publication Tokukai No. 2012-141713 A (Publication date: Jul. 26, 2012)
[Patent Literature 3]
  Japanese Patent Application Publication Tokukai No. 2001-337827 A (Publication date: Dec. 7, 2001)

SUMMARY OF INVENTION

Technical Problem

However, such conventional techniques have a problem that, in a case where a notification of a result of an action instruction given by a certain user is issued at a place of communication, such as a multiuser bulletin board, in which a plurality of users participate, it is difficult for the users to recognize at a glance to whom the notification is issued.

That is, according to the invention of Patent Literature 1, a target user for one (1) electronic virtual pet or one (1) personified agent is only an agent creator, and a case (e.g., multiuser bulletin board) is not assumed where a plurality of users can be targeted by one (1) agent.

Similarly, according to the invention of Patent Literature 3, a plurality of agents cooperatively communicate with one (1) user, and a case where a plurality of users can be targeted by the agents is not assumed. That is, the invention of Patent Literature 3 does not assume a situation in which it is difficult to recognize to whom a message from an agent is directed under a circumstance in which the agent can communicate with a plurality of users at the same time.

Furthermore, according to the invention of Patent Literature 2, a reply sentence is generated from a characteristic vector of a conversational sentence entered by a user. That is, in order for a computer to generate a reply sentence, there must be a conversational sentence entered by a user in advance of the reply sentence. Accordingly, the invention of Patent Literature 2 does not assume a situation in which, after a certain user gives a computer an action instruction, another user enters a conversational sentence before the computer notifies the certain user of a result of the action instruction.

The present invention is accomplished in view of the above problems, and a main object of the present invention is to provide a message notifying device which notifies a user, who is participating in a communication in which at least one user participates, of a message which (i) reports a result of an operation instruction given from the user and (ii) is explicitly directed to the user.

Solution to Problem

In order to attain the object, a message notifying device in accordance with an aspect of the present invention includes: operation instruction detecting means for (i) detecting an operation instruction, based on which an external device is operated, from a message in a communication service that displays, in a time series, messages which have been posted by members and (ii) specifies, as an instruction provider of the operation instruction, a member who has posted the message; external device control means for controlling the external device in accordance with the operation instruction which has been detected by the operation instruction detecting means; operation result obtaining means for obtaining a result of an operation executed by the external device in accordance with a control from the external device control means; report message generating means for generating a report message for reporting an operation result which has been obtained by the operation result obtaining means; and report message displaying means for outputting the report message, which has been generated by the report message generating means, to a server, which provides the communication service, so that the communication service displays the report message which is explicitly directed to the instruction provider who has been specified by the operation instruction detecting means.

Advantageous Effects of Invention

According to an aspect of the present invention, it is possible to bring about an effect of notifying a user, who is participating in a communication in which at least one user participates, of a message which (i) reports a result of an operation instruction given from the user and (ii) is explicitly directed to the user.

BRIEF DESCRIPTION OF DRAWINGS

FIG. 6 is a view illustrating a concrete example of a data structure of a command name table in which operation instruction identifiers are associated with respective names of operation instructions.

FIG. 7 is a view illustrating a concrete example of a data structure of an apparatus control table in which operation instruction identifiers are associated with respective apparatus control codes.

FIG. 8 is a view illustrating a concrete example of a data structure of a command image table in which image IDs are associated with respective operation instruction identifiers.

FIG. 9 is a view illustrating a concrete example of a data structure of a wording template table in which operation instruction identifiers are associated with respective message types and with respective wordings.

DESCRIPTION OF EMBODIMENTS

Embodiment 1

Figure 1:
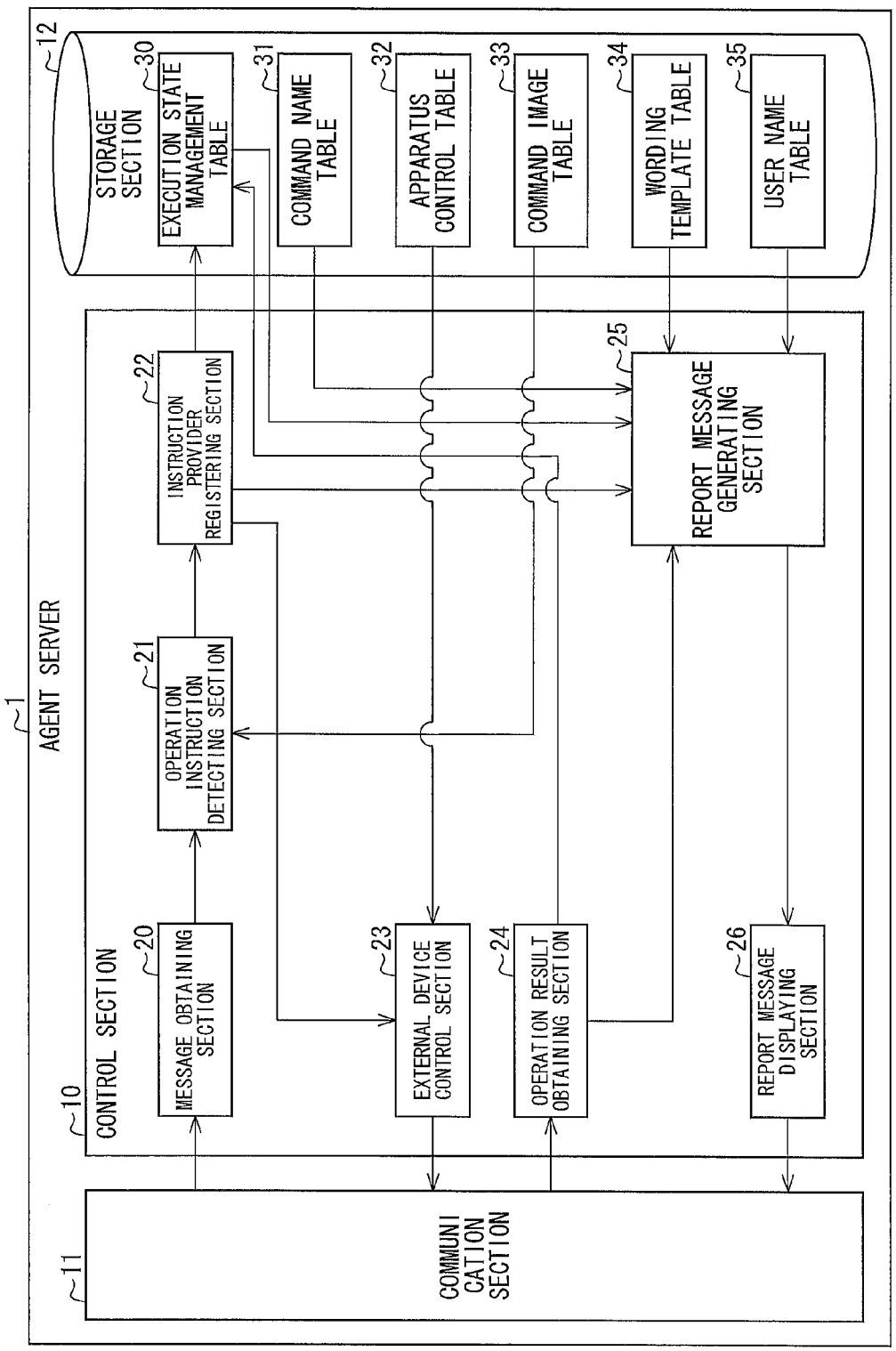
FIG. 1 is a block diagram illustrating an example configuration of main parts of an agent server in accordance with an embodiment of the present invention.

The following description will discuss an embodiment of the present invention with reference to FIGS. 1 through 14.

In the present embodiment, an example will be described below in which a message notifying device of the present invention is applied to a family message board system. The family message board system is a communication system for carrying out, via a family message board (electronic conversation tool) provided by a family message board server (conversation mediation server), a conversation by members (e.g., a father, a mother, and a child) of a family with the use of their own mobile terminals. By thus utilizing the family message board system, one (1) community is made up of one (1) family. The members can have a conversation with the use of shared terminals such as a network television and a tablet instead of their respective mobile terminals. The message notifying device of the present invention functions as the agent server in the family message board system. The agent server is a device which (i) personifies a household appliance, which operates in a house of the family, as a member of the family and (ii) is authorized to make a comment via the family message board of the family on behalf of the personified household appliance (hereinafter, referred to as "personified appliance"). The family message board system will be described later in detail.

Note that, in the descriptions below discussed with reference to the drawings, identical reference numerals are given to parts identical to each other or corresponding to each other, and explanations for such parts are not repeatedly made. Moreover, a dimensional relation such as a length, a size, and a width, and a shape in each of the drawings are altered as appropriate for clarifying and simplifying the drawings, i.e., the dimensions and the shapes depicted in the drawings are not actual ones.

[Overview of Family Message Board System]

Figure 2:
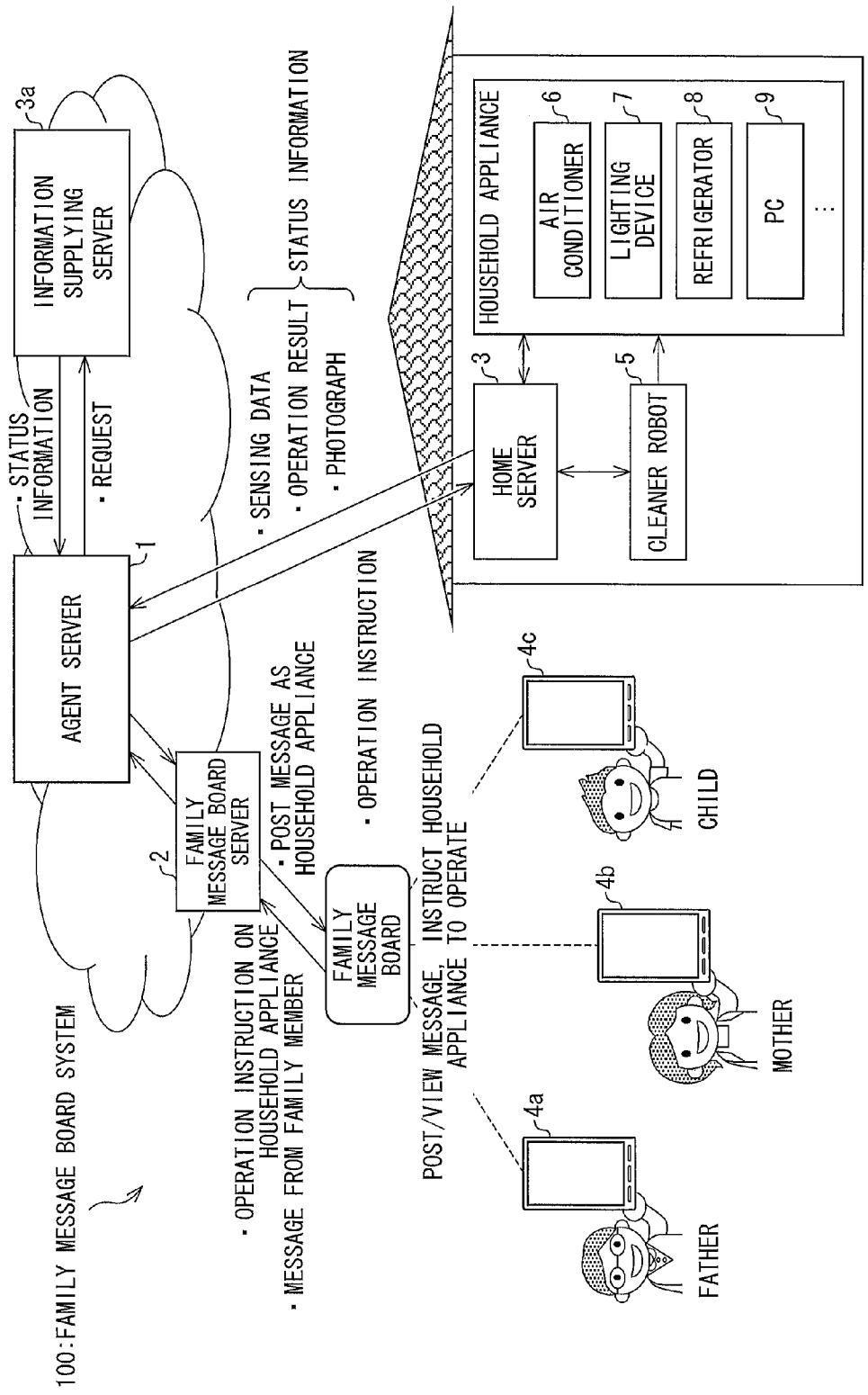
FIG. 2 is a view schematically illustrating a family message board system including the agent server illustrated in FIG. 1.

The following description will schematically discuss a family message board system in accordance with an embodiment of the present invention, with reference to FIG. 2. FIG. 2 is a view schematically illustrating a family message board system 100.

The family message board system 100 is a system that provides an electronic message board which is used by registered members of a community so as to communicate with each other. In the family message board system 100, a personified appliance is to post a message on a family message board while taking into consideration at least one of (i) a status of an apparatus (hereinafter, referred to as "household appliance") placed in a house (i.e., a space shared by members of a community) and (ii) contents of messages posted by the members, etc. Further, in the family message board system 100, it is possible to control operations of household appliances including the personified appliance based on an instruction given by any of the members.

As illustrated in FIG. 2, the family message board system 100 includes an agent server 1, a family message board server 2, and a home server 3. The members (i.e., a father, a mother, and a child in the example illustrated in FIG. 2) of the family can access the family message board with the use of their respective mobile terminals 4a, 4b, and 4c. Accordingly, each of the members can (i) post a message on the family message board, (ii) view the family message board, and (iii) give an operation instruction to a household appliance, with the use of his/her own mobile terminal. A cleaner robot 5 is connected with the home server 3 via a wireless communication. Further, other household appliances are connected with the home server 3 via wired or wireless communication connections. In the example illustrated in FIG. 2, the cleaner robot 5 is a personified appliance, and the other household appliances are an air conditioner 6, a lighting device 7, a refrigerator 8, and a PC (Personal Computer) 9. Note, however, that types of the household appliances and the number of the household appliances are not limited to particular ones. The household appliances can further encompass audio-visual equipment such as a television, a video recorder, and a speaker.

The agent server 1 posts a message on the family message board in accordance with (i) statuses of the household appliances, (ii) information obtained by the household appliances, and (iii) contents of messages posted by the members, etc. More specifically, the agent server 1 posts a message as a character created by personifying the cleaner robot 5. This allows the members of the family to experience a simulated communication with the cleaner robot 5 via the family message board.

The agent server 1 accepts operation instructions from the mobile terminals 4a, 4b, and 4c and transmits operation instructions, which correspond to the accepted instructions, to the home server 3 so as to control operations of the cleaner robot 5 or the other household appliances.

In the example discussed here, the agent server 1 has (i) a function to post a message on the family message board and (ii) a function to control operations of the cleaner robot 5 and the other household appliances. Note, however, that the two functions can be provided to respective different two servers.

The family message board server 2 carries out overall processes relating to the family message board. For example, the family message board server 2 (i) provides a display image of the family message board to the mobile terminals 4a, 4b, and 4c and (ii) manages messages which are posted on the family message board.

The home server 3 comprehensively controls transmission and reception of information between (i) the cleaner robot 5 or any of the household appliances and (ii) the agent server 1. Specifically, the home server 3 controls an operation of the cleaner robot 5 or any of the household appliances in accordance with an operation instruction received from the agent server 1. Moreover, the home server 3 transmits, to the agent server 1, information obtained from the cleaner robot 5 and information obtained from the household appliances.

In the example illustrated in FIG. 2, the home server 3 transmits (i) sensing data obtained by a sensor provided in the cleaner robot 5 or in any of the household appliances, (ii) an operation log of the household appliances, and (iii) a photograph taken by any of the household appliances. Note, however, that the information to be transmitted is not limited to such examples. The information thus collected in the house is supplied from the home server 3 to the agent server 1 as status information which is indicative of events in the community. The agent server 1 can grasp a status of the community (in this case, a status of the house or the family illustrated in FIG. 2) by utilizing the status information.

In a case where, for example, the comprehensive control is not needed, i.e., no household appliance exists which is involved in the family message board, it is possible to employ a configuration in which (i) the home server 3 is not provided and (ii) information is transmitted and received between the cleaner robot 5 and the agent server 1.

Each of the mobile terminals 4a, 4b, and 4c is a device for use in (i) viewing the family message board, (ii) posting a message on the family message board, and (iii) giving operation instructions to the cleaner robot 5 and the other household appliances. In the example illustrated in FIG. 2, each of the mobile terminals 4a, 4b, and 4c is configured by a smart phone. Note, however, that the mobile terminals 4a, 4b, and 4c are not limited to this, provided that the mobile terminals 4a, 4b, and 4c can be used to (i) view the family message board, (ii) post a message on the family message board, and (iii) give operation instructions. Hereinafter, the mobile terminals 4a, 4b, and 4c are collectively referred to as "mobile terminal 4", unless it is particularly necessary to distinguish the mobile terminals 4a, 4b, and 4c from each other. Moreover, hereinafter, the members illustrated in FIG. 2 are expressed as follows: that is, the father is expressed as "Father", the mother is expressed as "Mother", the child is expressed as "Taro", and the cleaner robot 5 is expressed as "Robo", as pieces of information indicative of a member who posted a message on the family message board displayed on the screen of the mobile terminal 4.

The cleaner robot 5 is a self-propelled cleaner for automatically cleaning a floor. In addition to the function to carry out cleaning, the cleaner robot 5 has functions such as a function to store an operation log, a function to detect and output a remaining battery power, a function to capture an image, a function to recognize a voice, and a function to output a voice. Further, the cleaner robot 5 has a function to transmit a control signal to a household appliance so as to control the household appliance.

The air conditioner 6 is a device for conditioning air by, for example, cooling or heating the air. The air conditioner 6 includes a temperature sensor and transmits, to the home server 3, a room temperature detected by the temperature sensor.

The lighting device 7 includes a light source such as an LED. The lighting device 7 can be controlled to be turned on or off by the home server 3.

The refrigerator 8 is a storage for storing foods, etc. at an appropriate temperature. According to the present embodiment, the refrigerator 8 includes, for example, sensing apparatuses such as a camera, a weight sensor, and an IC tag reader. The refrigerator 8 has (i) a function to obtain, as status information, a stock status in the refrigerator 8 and (ii) a communication function to upload the status information to the home server 3.

The PC 9 is a so-called personal computer. The PC 9 can be (i) one PC 9 which is shared by the members of the family or (ii) a plurality of PCs 9 owned by the respective members. The PC 9 is configured by, for example, a desktop personal computer, a laptop computer, or a tablet PC. According to the present embodiment, the PC 9 contains an application for managing a schedule so that schedules of the members can be registered or read out with the use of the PC 9. Information (calendar information) of the schedules of the members entered via the PC 9 is uploaded to the home server 3 as status information so as to be shared by the PC(s) 9, the mobile terminals 4a, 4b, and 4c, and the agent server 1.

The agent server 1 further has an information retrieving function to collect necessary information via the Internet. As illustrated in FIG. 2, the agent server 1 can access an information supplying server 3a connected with the Internet. Note that, although not illustrated, the agent server 1 is assumed to be configured also to access other information supplying servers 3b, 3c, and so forth. According to the present embodiment, the agent server 1 can grasp a status of an external environment surrounding the illustrated community (i.e., events caused in the external environment which can influence the family) by obtaining requested status information from the information supplying server 3a. The status information obtained from the information supplying server 3a is not limited to the information above described. For example, the status information is assumed to be (i) information on a retail store or a facility located near to the house of the family and (ii) weather forecast information of an area in which the members of the family are interested.

In the family message board system 100, when the agent server 1 detects an operation instruction, which is given for operating an external device, from a message posted on the family message board by a member, the agent server 1 controls the external device in accordance with the operation instruction. Then, the agent server 1 posts one (1) report message which (i) reports an operation result of the external device and (ii) is explicitly directed to the member. In this case, the agent server 1 posts a message on the family message board on behalf of the personified cleaner robot 5 which is a member of the community (family).

The following description will discuss details of a configuration of the agent server 1 which notifies a member of a message which (i) reports a result of an operation instruction given from the member and (ii) is explicitly directed to the member.

[Configuration of Agent Server]

FIG. 1 is a block diagram illustrating an example configuration of main parts of the agent server 1.

The agent server 1 of the present embodiment includes: an operation instruction detecting section 21 (operation instruction detecting means) for (i) detecting, from a message on the family message board, an operation instruction for operating the cleaner robot 5 (external device) and (ii) specifying, as an instruction provider of the operation instruction, a member who has posted the message; an external device control section 23 (external device control means) for controlling the external device in accordance with the operation instruction which has been detected by the operation instruction detecting section 21; an operation result obtaining section 24 (operation result obtaining means) for obtaining an operation result of the external device which has been controlled by the external device control section 23; a report message generating section 25 (report message generating means) for generating a report message for reporting the operation result which has been obtained by the operation result obtaining section 24; and a report message displaying section 26 (report message displaying means) for outputting the report message, which has been generated by the report message generating section 25, to the family message board server 2 so that the report message is displayed on the family message board while being explicitly directed to the instruction provider who has been specified by the operation instruction detecting section 21.

According to the configuration, in a communication (e.g., a family message board) in which at least one user participates, the agent server 1 can post a message which (i) reports a result of an operation instruction that has been given from a user and (ii) is explicitly directed to the user.

The agent server 1 further includes a storage section 12, a message obtaining section 20, and an instruction provider registering section 22. Note, however, that the storage section 12 and the instruction provider registering section 22 are not essential elements in the present embodiment described below in detail (with regard to this, details will be described later).

The agent server 1 includes a control section 10, a communication section 11, and a storage section 12 (see FIG. 1).

The communication section 11 is provided for the agent server 1 to communicate with an external apparatus. Specifically, the agent server 1 communicates with the family message board server 2, the home server 3, and the information supplying servers 3a, 3b, 3c, and so forth via the communication section 11.

The storage section 12 non-transitorily stores (1) a control program, (2) an OS program, (3) application programs, and (4) various kinds of data. The control program and the OS program are executed by the control section 10 of the agent server 1. The application programs are executed by the control section 10 in order to carry out the functions of the agent server 1. The various kinds of data are read out when the application programs are executed.

The pieces of data (1) through (4) are stored in, for example, a nonvolatile storage device such as a ROM (read only memory), a flash memory, an EPROM (Erasable Programmable ROM), an EEPROM (Registered Trademark) (Electrically EPROM), or an HDD (Hard Disc Drive).

The agent server 1 can include a temporary storage section (not illustrated). The temporary storage section is a so-called working memory which temporarily stores data such as (i) data used in arithmetical operation carried out while the agent server 1 is executing various kinds of processes and (ii) results of the arithmetical operation. The temporary storage section is configured by a volatile storage device such as a RAM (Random Access Memory).

Which data is stored and which storage device the data is to be stored are determined as appropriate in accordance with a factor such as an intended use of the agent server 1, convenience, cost, or a physical restriction.

The storage section 12 stores an execution state management table 30, a command name table 31, an apparatus control table 32, a command image table 33, a wording template table 34, and a user name table 35. Details of the execution state management table 30 and the like stored in the storage section 12 will be described later.

The control section 10 comprehensively controls functions of the agent server 1. The control section 10 includes, as functional blocks, the message obtaining section 20, the operation instruction detecting section 21, the instruction provider registering section 22, the external device control section 23, the operation result obtaining section 24, the report message generating section 25, and the report message displaying section 26.

The functional blocks of the control section 10 can be achieved by, for example, a CPU (central processing unit) which loads, into a RAM (random access memory) (not illustrated), a program stored in a storage device (storage section 12) configured by a ROM (read only memory) or by an NVRAM (non-volatile random access memory).

The message obtaining section 20 obtains, from the family message board server 2, messages which have been posted on the family message board by the members of the family. A message obtained by the message obtaining section 20 can be only a text or can include an image ID.

In the descriptions below, the message obtaining section 20 is assumed to obtain a message, which has been posted by a member on the family message board, in a JSON format as below. That is, the message obtaining section 20 obtains a message in, for example, a form as follows: {"poster": "U001", "text": "Take a photograph", "image_ID": "SEAL_101"}. Note, however, that, according to the message notifying device in accordance with an aspect of the present invention, it is not essential for the message obtaining section 20 to obtain a message in the JSON format. In the message in the JSON format, "poster" indicates a user identifier of a member who has posted the message, "text" indicates a text part of the message, and "image_ID" indicates an image ID attached to the message.

The image ID is an ID for uniquely specifying an image which is incorporated in an application of the mobile terminal 4. By attaching an image ID to a message to be outputted to the family message board server 2, it is possible to output a message with an image to the family message board server 2.

Note that such a message containing an image ID is not described in the present embodiment but will be described later in detail.

The operation instruction detecting section 21 (i) detects, from a message posted on the family message board by a member, an operation instruction on operating an external device and (ii) specifies the member, who has posted the message, as an instruction provider of the operation instruction. Further, the operation instruction detecting section 21 transmits the detected operation instruction and the specified instruction provider to the instruction provider registering section 22.

The following description will schematically discuss a function of the instruction provider registering section 22. Firstly, the instruction provider registering section 22 judges an execution state of an operation executed in accordance with the operation instruction which has been detected by the operation instruction detecting section 21. The instruction provider registering section 22 judges an execution state by judging whether or not the operation instruction, which has been detected by the operation instruction detecting section 21, is identical with an operation instruction contained in the execution state management table 30 (details of this will be described later). Secondly, the instruction provider registering section 22 updates data in the execution state management table 30 in accordance with a judgment result of the execution state. Thirdly, the instruction provider registering section 22 transmits an operation instruction to the external device control section 23 in accordance with the judgment result of the execution state. Fourthly, the instruction provider registering section 22 causes the report message generating section 25 to generate a message whose content corresponds to the judgment result of the execution state. Note that, when the report message generating section 25 generates a message, the report message generating section 25 refers to data in the execution state management table 30 which data has been updated by the operation instruction detecting section 21. Under the circumstances, the data in the execution state management table 30 needs to be updated in accordance with the judgment result of the execution state before the report message generating section 25 generates the message. Meanwhile, the operation instruction can be transmitted to the external device control section 23 at an identical timing at which the report message generating section 25 generates the message, provided that judgment on the execution state has already been made.

The following description will discuss details of the function of the instruction provider registering section 22.

Firstly, the instruction provider registering section 22 judges an execution state. In the execution state management table 30, data is contained in a case where an instructed operation is being executed in accordance with the operation instruction, whereas no data is contained in a case where no operation is being executed. The instruction provider registering section 22 first confirms whether or not data is already contained in the execution state management table 30, and then judges whether or not an operation instruction, which has been detected by the operation instruction detecting section 21, is identical with an operation instruction contained in the execution state management table 30.

Secondly, the instruction provider registering section 22 updates the data in the execution state management table 30 in accordance with a result of the judgment.

Specifically, in a case where the instruction provider registering section 22 confirms that no data is contained in the execution state management table 30, the instruction provider registering section 22 adds, to the execution state management table 30, an operation instruction detected by the operation instruction detecting section 21, an instruction provider of the operation instruction, and an instruction provider specified by the operation instruction detecting section 21.

In a case where the instruction provider registering section 22 confirms that data is already contained in the execution state management table 30, the instruction provider registering section 22 confirms whether or not an operation instruction, which has been detected by the operation instruction detecting section 21, is identical with an operation instruction which is already contained in the execution state management table 30.

In a case where the operation instruction, which has been detected by the operation instruction detecting section 21, is identical with the operation instruction which is already contained in the execution state management table 30, the instruction provider registering section 22 adds the instruction provider, who has been specified by the operation instruction detecting section 21, to the execution state management table 30 as an instruction provider to be additionally associated with the operation instruction which is already contained in the execution state management table 30.

In the execution state management table 30, the operation instruction is associated with a member(s) who has posted a message including the operation instruction on the family message board (details of this will be described later). Specifically, in the execution state management table 30, an operation instruction (more specifically, an operation instruction identifier for identifying each operation instruction) is contained in an "operation instruction identifier field", and an instruction provider (more specifically, a user identifier for identifying each member) of the operation instruction is contained in a "user list field" (see FIG. 5). Hereinafter, the "user list field" is referred to simply as "user list" for avoiding redundancy of expression.

In a case where the operation instruction, which has been detected by the operation instruction detecting section 21, is identical with the operation instruction which is already contained in the execution state management table 30, the instruction provider registering section 22 adds the instruction provider, who has been specified by the operation instruction detecting section 21, to the last of the "user list". That is, user identifiers of members are sequentially added to the "user list" in an order in which each of the members posts, on the family message board, a message including an operation instruction which corresponds to an operation instruction identifier contained in the "operation instruction identifier field".

In a case where the operation instruction, which has been detected by the operation instruction detecting section 21, is different from the operation instruction which is already contained in the execution state management table 30, the instruction provider registering section 22 does not update the data contained in the execution state management table 30.

Thirdly, the instruction provider registering section 22 transmits an operation instruction to the external device control section 23 in accordance with a judgment result of the execution state. Specifically, in a case where the instruction provider registering section 22 confirms that no data is contained in the execution state management table 30, the instruction provider registering section 22 transmits an operation instruction, which has been received from the operation instruction detecting section 21, to the external device control section 23. In a case where the instruction provider registering section 22 confirms that data is already contained in the execution state management table 30, the instruction provider registering section 22 does not transmit anything to the external device control section 23.

Fourthly, the instruction provider registering section 22 causes the report message generating section 25 to generate a message whose content corresponds to the judgment result of the execution state.

Specifically, in the case where the instruction provider registering section 22 confirms that no data is contained in the execution state management table 30, the instruction provider registering section 22 causes the report message generating section 25 to generate a message "Operation instruction has been accepted. Operation starts in accordance with the operation instruction" which is explicitly directed to the instruction provider who has been specified by the operation instruction detecting section 21.

When the instruction provider registering section 22 confirms that data is contained in the execution state management table 30, the instruction provider registering section 22 then judges whether or not the operation instruction, which has been detected by the operation instruction detecting section 21, is identical with the operation instruction contained in the execution state management table 30.

In a case where the operation instruction, which has been detected by the operation instruction detecting section 21, is different from the operation instruction which is contained in the execution state management table 30, the instruction provider registering section 22 causes the report message generating section 25 to generate a message "Instructed operation cannot be executed because another operation is being executed" which is explicitly directed to the instruction provider who has been specified by the operation instruction detecting section 21.

In a case where the operation instruction, which has been detected by the operation instruction detecting section 21, is identical with the operation instruction which is contained in the execution state management table 30, the instruction provider registering section 22 causes the report message generating section 25 to generate a message "Please wait because the operation instructed this time is already being executed by the instruction from another member" which is explicitly directed to the instruction provider who has been specified by the operation instruction detecting section 21.

Note that the instruction provider registering section 22 causes the report message generating section 25 to generate any of the above messages by transmitting the following information to the report message generating section 25. That is, the instruction provider registering section 22 transmits (i) an operation instruction identifier of an operation instruction which has been detected by the operation instruction detecting section 21, (ii) a user identifier of a member which has been specified by the operation instruction detecting section 21, and (iii) a message type based on which the report message generating section 25 identifies a message to be generated.

The message type is an identifier for identifying, for each operation instruction, a message to be generated by the report message generating section 25 (details of this will be described later). In the wording template table 34 illustrated in FIG. 9, each wording is determined in accordance with a combination of an operation instruction identifier and a message type.

For example, in a case where the operation instruction identifiers are identical with each other in FIG. 9, a message type "RP_START" is assigned to the message "Operation instruction has been accepted. Operation starts in accordance with the operation instruction", which is explicitly directed to the instruction provider who has been specified by the operation instruction detecting section 21. A message type "RP_BUSY_1" is assigned to the message "Please wait because the operation instructed this time is already being executed by the instruction from another member", which is explicitly directed to the instruction provider who has been specified by the operation instruction detecting section 21. A message type "RP_BUSY_2" is assigned to the message "Instructed operation cannot be executed because another operation is being executed", which is explicitly directed to the instruction provider who has been specified by the operation instruction detecting section 21.

Note that both the messages corresponding to the respective message types "RP_BUSY_1" and "RP_BUSY_2" can be replaced with an identical message "Instruction cannot be accepted because operation is being executed".

That is, it is possible to employ a configuration in which the message "Instruction cannot be accepted because operation is being executed" is defined by a message type "RP_BUSY", and the message type "RP_BUSY" is transmitted instead of the separate message types "RP_BUSY_1" and "RP_BUSY_2". Specifically, in a case where the instruction provider registering section 22 confirms that data is contained in the execution state management table 30, the instruction provider registering section 22 can transmit, to the report message generating section 25, (i) an operation instruction identifier indicative of an operation instruction which has been detected by the operation instruction detecting section 21 and (ii) a message type "RP_BUSY". In this case (i.e., data is contained in the execution state management table 30), the report message generating section 25 generates the following message regardless of whether or not the operation instruction, which has been detected by the operation instruction detecting section 21, is identical with the operation instruction which is contained in the execution state management table 30. That is, the report message generating section 25 generates a message "Instruction cannot be accepted because operation is being executed", which is explicitly directed to the instruction provider who has been specified by the operation instruction detecting section 21.

Upon receipt of an operation instruction (more accurately, operation instruction identifier) from the instruction provider registering section 22, the external device control section 23 controls an external device in accordance with the operation instruction. Specifically, when the external device control section 23 has obtained an operation instruction identifier from the operation instruction detecting section 21, the external device control section 23 selects an apparatus control code corresponding to the operation instruction identifier with reference to the apparatus control table 32, and then transmits the apparatus control code to a corresponding external device.

The operation result obtaining section 24 obtains, from the external device, (i) a result of an operation executed in accordance with the operation instruction (i.e., a return value including an error code) and (ii) an operation instruction identifier of the operation instruction.

The return value is an operation result of an external device and includes data obtained as a result of an operation of the external device. For example, in a case where an operation instruction identifier is "CM001", i.e., an instructed operation is "photographing", the return value can be data of a photographed image. Alternatively, in a case where an operation instruction identifier is "CM003", i.e., an instructed operation is "obtaining temperature", the return value can be data of a room temperature.

The error code is notified by an external device to the agent server 1 for each error in operation. For example, in a case where the cleaner robot 5 tries to execute "photographing" but "photographing has been failed", the cleaner robot 5 transmits, to the agent server 1, an error code "1" together with an operation instruction identifier (CM001) of the operation instruction "photographing". In a case where the cleaner robot 5 tries to execute "cleaning" but "cleaning could not be executed because the dust cup is full", the cleaner robot 5 transmits, to the agent server 1, an error code "1" together with an operation instruction identifier (CM002) of the operation instruction "cleaning". In a case where the cleaner robot 5 tries to execute "cleaning" but "cleaning could not be executed because of being immovable", the cleaner robot 5 transmits, to the agent server 1, an error code "2" together with an operation instruction identifier "CM002".

As such, even for an identical error result that, for example, "cleaning could not be executed", different error codes are issued in accordance with reasons for the errors. Moreover, even in a case of an identical error code "1", the operation result obtaining section 24 can identify that, for example, "photographing" resulted in error or "cleaning" resulted in error, based on the different operation instruction identifiers which have been transmitted together with the error code. That is, by receiving an error code and an operation instruction identifier from the external device, the operation result obtaining section 24 can confirm in what kind of error an operation instruction corresponding to the operation instruction identifier resulted.

The operation result obtaining section 24 obtains, from the external device, (i) a result of an operation executed in accordance with an operation instruction (that is, a return value including an error code) and (ii) an operation instruction identifier corresponding to the operation instruction. Then, the operation result obtaining section 24 causes the report message generating section 25 to generate a report message regarding the operation result. Specifically, the operation result obtaining section 24 causes the report message generating section 25 to generate a report message regarding an operation result by transmitting the following information to the report message generating section 25. That is, in a case where the operation has succeeded, the operation result obtaining section 24 transmits a message type "RP_SUCCEEDED" and a return value together with an operation instruction identifier of an operation instruction by which the operation has been instructed. Alternatively, in a case where an operation has failed, the operation result obtaining section 24 transmits a message type "RP_FAILED_error code" together with the operation instruction identifier of the operation instruction by which the operation has been instructed.

Therefore, for example, in a case where the operation result obtaining section 24 transmits an operation instruction identifier "CM001" and a message type "RP_FAILED_1" to the report message generating section 25, the report message generating section 25 generates a message indicating that an operation executed in accordance with the operation instruction "photographing" has resulted in "photographing has been failed". Alternatively, for example, in a case where the report message generating section 25 has received an operation instruction identifier "CM002" and a message type "RP_FAILED_2", the report message generating section 25 generates a message indicating that an operation executed in accordance with the operation instruction "cleaning" has resulted in "cleaning could not be executed because of being immovable". Alternatively, in a case where the report message generating section 25 has received an operation instruction identifier "CM001", a message type "SUCCEEDED", and photograph image data, the report message generating section 25 generates a message which indicates that "photographing has succeeded" and in which the photograph image data is embedded.

Note that how the report message generating section 25 obtains a destination of a message, which destination is explicitly indicated in a report message for reporting an operation result, will be described later.

Upon receipt, from the external device, of a result (i.e., a return value including an error code) of an operation which has been executed in accordance with an operation instruction, the operation result obtaining section 24 deletes data in the execution state management table 30. That is, a combination of an operation instruction, which has been detected by the operation instruction detecting section 21, and an instruction provider of the operation instruction is contained in the execution state management table 30 during only a time period between (i) when the operation instruction detecting section 21 detects the operation instruction and (ii) when the operation result obtaining section 24 obtains a result of an operation executed in accordance with the operation instruction. Accordingly, while no operation is being executed by the external device in accordance with an operation instruction, that is, the agent server 1 is not causing the external device to execute any operation, no data is contained in the execution state management table 30.

The following description will schematically discuss a function of the report message generating section 25. Firstly, the report message generating section 25 generates a message in accordance with an operation instruction identifier, a user identifier, and a message type which have been received from the instruction provider registering section 22. Secondly, the report message generating section 25 generates a message in accordance with a message type, a return value, and an operation instruction identifier which have been received from the operation result obtaining section 24.

The following description will discuss details of the function of the report message generating section 25.

Firstly, as above described, the report message generating section 25 generates the following message, which is explicitly directed to an instruction provider, who has been specified by the operation instruction detecting section 21, in accordance with information which has been received from the instruction provider registering section 22. That is, the report message generating section 25 generates a message "Operation instruction has been accepted. Operation starts in accordance with the operation instruction" or a message "Instruction cannot be accepted because operation is being executed".

Specifically, when the instruction provider registering section 22 confirms that no data is contained in the execution state management table 30, the instruction provider registering section 22 then transmits the following information to the report message generating section 25. That is, the instruction provider registering section 22 transmits, to the report message generating section 25, an operation instruction identifier of an operation instruction which has been detected by the operation instruction detecting section 21, a user identifier of a member who has been specified by the operation instruction detecting section 21, and a message type "RP_START". Upon receipt of the information, the report message generating section 25 generates, with reference to the wording template table 34 exemplified in FIG. 9, a message which (i) indicates that an operation instruction corresponding to the operation instruction identifier has been accepted and (ii) is explicitly directed to a user corresponding to the user identifier.

When the instruction provider registering section 22 confirms that data is contained in the execution state management table 30 and the operation instruction, which has been detected by the operation instruction detecting section 21, is identical with the operation instruction which is contained in the execution state management table 30, the instruction provider registering section 22 transmits the following information. That is, the instruction provider registering section 22 transmits, to the report message generating section 25, an operation instruction identifier of the operation instruction which has been detected by the operation instruction detecting section 21, a user identifier of a member who has been specified by the operation instruction detecting section 21, and a message type "RP_BUSY_1". Upon receipt of the information, the report message generating section 25 generates, with reference to the wording template table 34 exemplified in FIG. 9, the following message which is explicitly directed to a user corresponding to the user identifier. That is, the report message generating section 25 generates a message indicating that "an operation is being executed in accordance with an operation instruction which (i) corresponds to the operation instruction identifier and (ii) has been given from a member who (a) is one of members associated, in the execution state management table 30, with the operation instruction identifier and (b) is not a member last added to the execution state management table 30".

Note that, as described above, in a case where the operation instruction which has been detected by the operation instruction detecting section 21 is identical with the operation instruction which is already contained in the execution state management table 30, the instruction provider registering section 22 adds the member, who has been specified by the operation instruction detecting section 21, to the last of the user list. From this, in a case where the operation instruction, which has been detected by the operation instruction detecting section 21, and the operation instruction, which is contained in the execution state management table 30, are identical with each other when the report message generating section 25 refers to the execution state management table 30 in order to generate the message, the following fact is true. That is, "the last added member among the members associated, in the execution state management table 30, with the operation instruction identifier" (i.e., the last member of the user list) is the member who has been specified (this time) by the operation instruction detecting section 21.

In a case where the instruction provider registering section 22 confirms that data is contained in the execution state management table 30 and the operation instruction, which has been detected by the operation instruction detecting section 21, is different from the operation instruction which is contained in the execution state management table 30, the instruction provider registering section 22 transmits the following information. That is, the instruction provider registering section 22 transmits, to the report message generating section 25, an operation instruction identifier of the operation instruction which has been detected by the operation instruction detecting section 21, a user identifier of a member who has been specified by the operation instruction detecting section 21, and a message type "RP_BUSY_2". Upon receipt of the information, the report message generating section 25 generates, with reference to the wording template table 34 exemplified in FIG. 9, the following message which is explicitly directed to a user corresponding to the user identifier. That is, the report message generating section 25 generates a message indicating that "an operation is being executed in accordance with an operation instruction which (i) corresponds to the operation instruction identifier in the execution state management table 30 and (ii) has been given from all the members contained in the member list of the execution state management table 30".

Note that, as described above, in a case where the operation instruction which has been detected by the operation instruction detecting section 21 is different from the operation instruction which is already contained in the execution state management table 30, the instruction provider registering section 22 does not add, to the user list, the member who has been specified by the operation instruction detecting section 21.

Secondly, when the operation result obtaining section 24 has obtained a result of an operation of the external device, the report message generating section 25 generates one (1) report message regarding the result and determines a destination of the report message as follows. That is, the report message generating section 25 determines that the report message is to be directed to all instruction providers who are associated, in the execution state management table 30, with the operation instruction of the operation whose result is reported by the report message.

As above described, when the operation executed in accordance with the operation instruction ends, i.e., when the operation result obtaining section 24 obtains the operation result, the operation result obtaining section 24 transmits, if the operation has succeeded, a message type "RP_SUCCEEDED" and a return value to the report message generating section 25 together with an operation instruction identifier of the operation instruction on the operation. Alternatively, if the operation has been failed, the operation result obtaining section 24 transmits a message type "RP_FAILED_error code" to the report message generating section 25 together with the operation instruction identifier of the operation instruction on the operation.

In accordance with the message type and the operation instruction identifier which have been received from the operation result obtaining section 24, the report message generating section 25 selects, with reference to the wording template table 34, a wording of a report message to be generated. Moreover, the report message generating section 25 obtains, with reference to the user list in the execution state management table 30, a member to which the report message is to be explicitly directed. That is, the report message generating section 25 generates one (1) report message which is explicitly directed to all the members contained in the user list and indicates the operation result obtained by the operation result obtaining section 24.

Note that, in a case where no wording in the wording template table 34 corresponds to the operation instruction identifier and the message type which have been obtained from the instruction provider registering section 22 and the operation result obtaining section 24, the report message generating section 25 does not generate a message.

For example, an operation instruction identifier "CM003" corresponds to an operation instruction "Tell the temperature", i.e., an operation instruction on "obtaining temperature". A result of an operation executed in accordance with the operation instruction on "obtaining temperature" can be obtained from the external device immediately, and therefore no wording is defined for a message type "RP_START". As such, in a case where the report message generating section 25 has obtained the operation instruction identifier "CM003" and the message type "RP_START" from the instruction provider registering section 22, the report message generating section 25 does not generate a message because no wording in the wording template table 34 corresponds to the combination of the operation instruction identifier and the message type.

The report message displaying section 26 outputs, to the family message board server 2, the report message, which has been generated by the report message generating section 25, so that the message is displayed on the family message board while being explicitly directed to an instruction provider who has been specified by the operation instruction detecting section 21.

[Contents of Tables]

The storage section 12 illustrated in FIG. 1 stores the execution state management table 30, the command name table 31, the apparatus control table 32, the command image table 33, the wording template table 34, and the user name table 35.

Figures 4, 5:
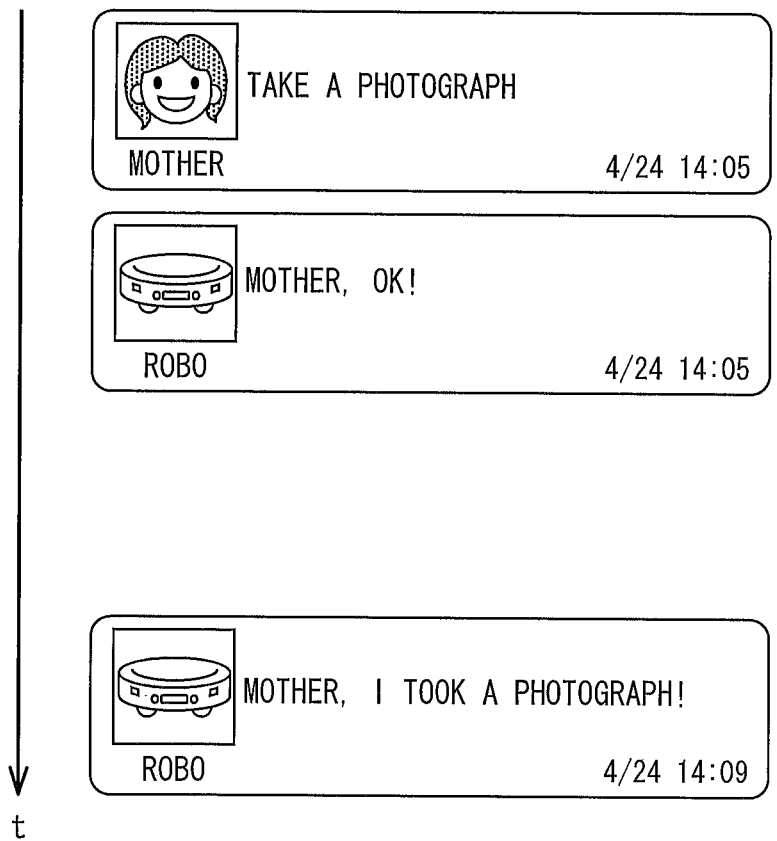
FIG. 4 is a view illustrating a time series of exchanging messages on a family message board between the agent server of FIG. 1 and one of family members.
FIG. 5 is a view illustrating a concrete example of a data structure of an execution state management table in which an operation instruction is associated with instruction providers who have given the operation instruction.

FIG. 5 is a view illustrating a concrete example of a data structure of the execution state management table 30 in which an operation instruction is associated with instruction providers who have given the operation instruction.

FIG. 6 is a view illustrating a concrete example of a data structure of the command name table 31 in which operation instruction identifiers are associated with respective names of operation instructions.

FIG. 7 is a view illustrating a concrete example of a data structure of the apparatus control table 32 in which operation instruction identifiers are associated with respective apparatus control codes.

FIG. 8 is a view illustrating a concrete example of a data structure of the command image table 33 in which image IDs are associated with respective operation instruction identifiers.

FIG. 9 is a view illustrating a concrete example of a data structure of the wording template table 34 in which operation instruction identifiers are associated with respective message types and with respective wordings.

Figures 10, 11:
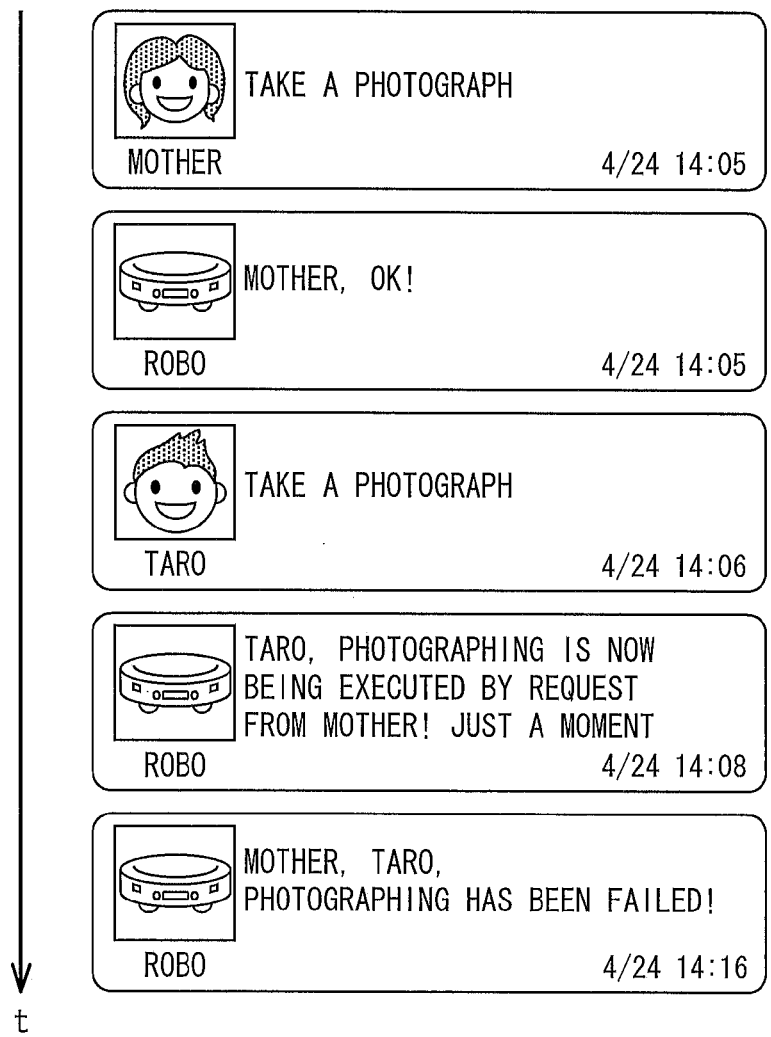
FIG. 10 is a view illustrating a concrete example of a data structure of a user name table in which user identifiers are associated with respective user names.
FIG. 11 is a view illustrating a time series of exchanging messages on a family message board between an agent server in accordance with another embodiment of the present invention and a plurality of family members.

FIG. 10 is a view illustrating a concrete example of a data structure of the user name table 35 in which user identifiers are associated with respective user names.

The execution state management table 30 contains, for each operation instruction, a member (as an instruction provider) who has posted a message corresponding to the operation instruction. That is, in the execution state management table 30, an operation instruction is associated with a member who has posted, on the family message board, a message including the operation instruction. The following describes this in detail. That is, the execution state management table 30 contains a combination of an operation instruction, which has been detected by the operation instruction detecting section 21, and an instruction provider of the operation instruction during a time period from when the operation instruction is detected by the operation instruction detecting section 21 and to when the external device ends an operation executed in accordance with the operation instruction, i.e., to when the operation result obtaining section 24 obtains a result of the operation executed in accordance with the operation instruction.

The execution state management table 30 has two fields, i.e., an "operation instruction identifier field" and a "user list field" (see FIG. 5). In the "operation instruction identifier field", an operation instruction which has been detected by the operation instruction detecting section 21 (more specifically, an operation instruction identifier for identifying each operation instruction) is contained. In the "user list field", an instruction provider of the operation instruction, i.e., an instruction provider who has been specified by the operation instruction detecting section 21 (more specifically, a user identifier for identifying each instruction provider) is contained.

As early described, in a case where no operation is being executed, no data is contained in the execution state management table 30. In a case where an operation is being executed, an operation instruction identifier of an operation instruction, based on which the operation is being executed, is contained in the "operation instruction identifier field" of the execution state management table 30. The user list contains an instruction provider of an operation instruction which corresponds to an operation instruction identifier contained in the "operation instruction identifier field".

In the execution state management table 30 exemplified in FIG. 5, an operation instruction identifier "CM001" is contained in the operation instruction identifier field and users "U002, U003" are contained in the user list. In a case where an operation instruction corresponding to the operation instruction identifier "CM001" is "photographing" and members corresponding to the user identifiers "U002, U003" are "Mother, Taro", the execution state management table 30 illustrated in FIG. 5 indicates that (i) messages for instructing execution of "photographing" are posted on the family message board by "Mother" and "Taro" and (ii) the "photographing" is being executed.

Note that, as early described, in a case where an operation instruction which has been detected by the operation instruction detecting section 21 is identical with an operation instruction which is already contained in the execution state management table 30, the instruction provider registering section 22 adds, to the last of the user list, a member who has been specified by the operation instruction detecting section 21. That is, members (i.e., user identifiers) who have posted respective messages containing the operation instruction are added to the user list of the execution state management table 30 in an order in which the messages are posted on the family message board. As such, the execution state management table 30 contains information indicative of whether or not the external device is executing an operation in accordance with a control from the agent server 1. Further, in a case where an operation is being executed, the execution state management table 30 contains information indicative of (i) members who have posted respective messages, which include an operation instruction for instructing the operation, on the family message board and (ii) an order in which the members have posted the respective messages on the family message board. The report message generating section 25 generates a message which is explicitly directed to a member contained in the user list of the execution state management table 30.

The command name table 31 is a table for converting an operation instruction identifier into natural language.

The apparatus control table 32 contains apparatus control codes corresponding to respective operation instruction identifiers. The external device control section 23 transmits an apparatus control code to the external device so as to control the external device to execute an operation corresponding to the apparatus control code.

The command image table 33 defines a correspondence between image IDs and operation instruction identifiers. Details of the command image table 33 will be described later.

The wording template table 34 stores templates of messages to be generated by the report message generating section 25. That is, in the wording template table 34 exemplified in FIG. 9, each row defines one (1) message to be outputted from the agent server 1 to the family message board server 2.

The wording template table 34 has (i) an operation instruction identifier field that indicates, in each row, with which operation instruction each message is associated, (ii) a message type field that indicates identifiers for respective contents of messages, and (iii) a wording field that indicates contents of messages.

In each row of the wording field, a keyword in square brackets (e.g., "ALL_POSTER" included in a wording on the third row) indicates a part which is to be dynamically replaced with predetermined information. The following description will discuss a rule of replacement. For example, "LAST_POSTER" indicates a member corresponding to a user identifier which has been last added to the user list of the execution state management table 30. "FIRST_POSTER" indicates a member who is first added to the user list, and "ALL_POSTERS" indicates all members contained in the user list. "ALL_POSTERS-LAST_POSTER" indicates all members contained in the user list except for a member who has been last added to the user list. "Now_POSTER" indicates a member who (i) is not contained in the user list and (ii) has been specified by the operation instruction detecting section 21 this time as an instruction provider of an operation instruction.

Note that "CMD_NAME" is a name of an operation instruction which corresponds to an identifier of an operation instruction which is contained in the execution state management table 30, and the command name table contains operation instruction identifiers which are associated with respective operation instructions. "RETURN_VAL" indicates a return value.

The wording template table 34 exemplified in FIG. 9 has two rows containing respective operation instruction identifiers "CMXXX" and "CMYYY". Each of "CMXXX" and "CMYYY" indicates an arbitrary operation instruction identifier. Here, in a case where the report message generating section 25 has received a report type "RP_BUSY_1" or "RP_BUSY_2" which is associated with an arbitrary operation instruction identifier, the report message generating section 25 selects a wording that corresponds to "RP_BUSY_1" or "RP_BUSY_2".

The report types "RP_BUSY_1" and "RP_BUSY_2" can be unified into a single message type "RP_BUSY" which is associated with a wording "[CMD_NAME] is now being executed by request from [ALL_POSTER]! Just a moment". In a case where data is contained in the execution state management table 30, the instruction provider registering section 22 can be configured to transmit an operation instruction identifier of an operation instruction and a message type "RP_BUSY" to the report message generating section 25 regardless of whether or not the operation instruction, which has been detected by the operation instruction detecting section 21, is identical with an operation instruction which is contained in the execution state management table 30.

The user name table 35 is used to convert a user identifier, which is contained in a user list of the execution state management table 30 or the like, into an actual member name.

Note that the above described pieces of data, which are contained in the tables stored in the storage section 12, can be changed by a user.

For example, a member who is explicitly indicated in a message as a destination can be changed by appropriately changing "ALL_POSTER", "LAST_POSTER", "Now_POSTER", and the like in a wording contained in each row of the wording template table 34.

Specifically, in a case where an operation has been failed (i.e., a message type starts with "PR_FAILED_"), "ALL_POSTER" is set to be a destination of a message in the wording template table 34 illustrated in FIG. 9. In a case where the keyword "ALL_POSTER" is replaced with "FIRST_POSTER" (i.e., a member who is first added to the user list), a member, who is set to be an explicit destination of a message in a case where an operation has been failed, can be changed to only a "member who has first posted, on the family message board, a message which includes an operation instruction on the operation".

Similarly, in a case where "ALL_POSTER-LAST_POSTER" in a wording, which corresponds to an operation instruction identifier "CMXXX", is replaced with "FIRST_POSTER" in the wording template table 34 of FIG. 9, it is possible to notify that an operation is being executed in accordance with an instruction given by a "member who has first posted, on the family message board, a message including an operation instruction on the operation which is being executed".

[Overview of Process of Agent Server 1]

The following description will discuss overview of processes carried out by the agent server 1.

Figure 3:
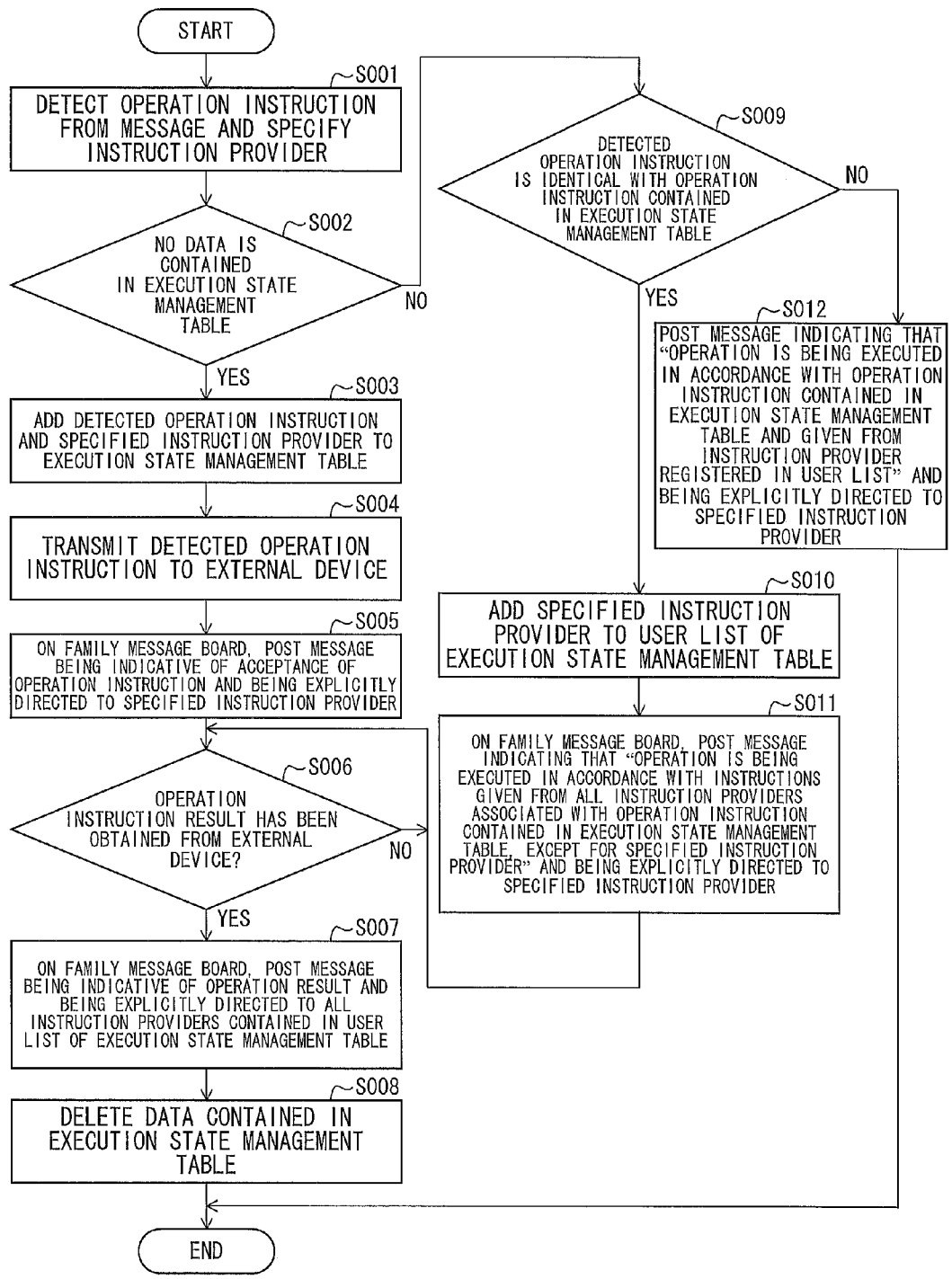
FIG. 3 is a flowchart illustrating a process flow of the agent server illustrated in FIG. 1.

FIG. 3 is a flowchart illustrating a process flow of the agent server 1.

First, the operation instruction detecting section 21 (i) detects an operation instruction from a message which the message obtaining section 20 has obtained from the family message board server 2 and (ii) specifies an instruction provider (S001).

Next, the instruction provider registering section 22 judges whether or not data is contained in the execution state management table 30 (S002).

In a case where no data is contained in the execution state management table 30 (Yes in S002), the instruction provider registering section 22 adds, to the execution state management table 30, an operation instruction which has been detected by the operation instruction detecting section 21 and the specified instruction provider (S003). In the case where no data is contained in the execution state management table 30, the instruction provider registering section 22 further transmits, to the external device control section 23, the operation instruction which has been detected by the operation instruction detecting section 21. Moreover, the instruction provider registering section 22 transmits, to the report message generating section 25, the operation instruction, the instruction provider of the operation instruction, and a message type "RP_START".

Upon receipt of the operation instruction from the instruction provider registering section 22, the external device control section 23 transmits an apparatus control code to a corresponding external device based on the operation instruction and the apparatus control table 32 (S004).

Upon receipt of the operation instruction, the instruction provider of the operation instruction, and the message type "RP_START" from the instruction provider registering section 22, the report message generating section 25 generates, with reference to the wording template table 34, a message which indicates that the operation instruction has been accepted. Note that the report message generating section 25 generates the message indicative of the acceptance of the operation instruction while explicitly indicating that the message is directed to the instruction provider received from the instruction provider registering section 22, i.e., the instruction provider who has been specified by the operation instruction detecting section 21. Then, the report message generating section 25 transmits a generated report message to the report message displaying section 26. The report message displaying section 26 transmits, to the family message board server 2, the message which has been generated by the report message generating section 25 (S005).

Subsequently, in a case where the operation result obtaining section 24 obtains, from the external device, a result of an operation executed in accordance with the operation instruction (Yes in S006), the operation result obtaining section 24 transmits the operation result to the report message generating section 25.

When the report message generating section 25 has obtained the operation result of the external device from the operation result obtaining section 24, the report message generating section 25 generates one (1) report message. Then, the report message generating section 25 sets, as a destination of the report message, all instruction providers who are associated, in the storage section, with the operation instruction for instructing the operation whose result is to be reported by the report message. Specifically, the report message generating section 25 generates one (1) report message which indicates the operation result obtained from the operation result obtaining section 24 and is explicitly directed to all members stored in the user list of the execution state management table 30. The report message displaying section 26 transmits, to the family message board server 2, the report message which has been generated by the report message generating section 25 (S007).

The operation result obtaining section 24, which has obtained the operation result from the external device, further deletes data in the execution state management table 30 which contains an operation instruction on the operation (S008). Note that, as early described, the report message generating section 25 obtains, with reference to the execution state management table 30, a member to which the report message is to be explicitly directed. Under the circumstances, the data in the execution state management table 30 is deleted by the operation result obtaining section 24 after the report message generating section 25 generates the report message.

During a time period in which the operation result obtaining section 24 does not obtain an operation result from the external device (No in S006), the operation result obtaining section 24 is waiting for an operation result which will be transmitted from the external device.

In a case where data is already contained in the execution state management table 30 (No in S002), the instruction provider registering section 22 judges whether or not an operation instruction, which is contained in the execution state management table 30, is identical with an operation instruction which has been detected by the operation instruction detecting section 21 (S009).

In a case where the operation instruction which is contained in the execution state management table 30 is identical with the operation instruction which has been detected by the operation instruction detecting section 21 (Yes in S009), the instruction provider registering section 22 adds the instruction provider, who has been specified by the operation instruction detecting section 21, to the execution state management table 30 as an instruction provider associated with the operation instruction which is already contained in the execution state management table 30. That is, the instruction provider registering section 22 adds the instruction provider, who has been specified by the operation instruction detecting section 21, to the user list in the execution state management table 30 (S010). As such, in the execution state management table 30, the instruction provider who has been specified by the operation instruction detecting section 21 this time is added to the last of the user list. Further, the instruction provider registering section 22 transmits, to the report message generating section 25, the operation instruction which has been detected by the operation instruction detecting section 21, an instruction provider of the operation instruction, and a message type "RP_BUSY_1".

The report message generating section 25, which has received the operation instruction, the instruction provider of the operation instruction, and the message type "RP_BUSY_1" from the instruction provider registering section 22, generates the following message with reference to the execution state management table 30 and the wording template table 34. That is, the report message generating section 25 generates a message which is explicitly directed to the instruction provider specified by the operation instruction detecting section 21 and indicates that "an operation is being executed in accordance with instructions given from all instruction providers, who are associated with the operation instruction which is contained in the execution state management table 30, except for the instruction provider who has been last added (i.e., the instruction provider who has been specified by the operation instruction detecting section 21 this time)". Then, the report message generating section 25 transmits the message, which has been thus generated, to the report message displaying section 26. The report message displaying section 26 transmits, to the family message board server 2, the message which has been generated by the report message generating section 25 (S011).

In a case where the operation instruction which is contained in the execution state management table 30 is different from the operation instruction which has been detected by the operation instruction detecting section 21 (No in S009), the instruction provider registering section 22 transmits, to the report message generating section 25, the operation instruction, which has been detected by the operation instruction detecting section 21, an instruction provider of the operation instruction, and a message type "RP_BUSY_2". The report message generating section 25 receives the operation instruction, the instruction provider, and the message type "RP_BUSY_2" from the instruction provider registering section 22 and then generates the following message with reference to the wording template table 34. That is, the report message generating section 25 generates a message which is explicitly directed to the instruction provider specified by the operation instruction detecting section 21 and indicates that "an operation is being executed in accordance with an operation instruction which has been given from an instruction provider who is associated, in the execution state management table 30, with the operation instruction". The report message displaying section 26 transmits, to the family message board server 2, the message which has been generated by the report message generating section 25 (S012).

[Flow of Posting Message]

The following description will concretely discuss a flow of processes carried out by the agent server 1, with reference to exchanging of messages on the family message board between the agent server 1 illustrated in FIG. 4 and Mother (i.e., a member of the family).

FIG. 4 is a view illustrating a time series of exchanging messages on the family message board between the agent server 1 and Mother (i.e., one of family members). Here, it is assumed that no operation is executed by the external device in accordance with a control from the agent server 1 before a message "Take a photograph" is posted on the family message board by Mother with the use of the mobile terminal 4 in the exchanging of messages illustrated in FIG. 4. In other words, no data is contained in the execution state management table 30 at a time point at which the message is posted by Mother.

As illustrated in FIG. 4, when Mother posts the message "Take a photograph" on the family message board at 14:05, the message obtaining section 20 obtains, from the family message board server 2, the message posted by Mother. Specifically, the message obtaining section 20 obtains, from the family message board server 2, the message in, for example, the JSON format, i.e., {"poster": "U002", "text": "Take a photograph", "image_ID": " "}. Note that "U002" is a user identifier indicative of "Mother" as indicated by the user name table 35 illustrated in FIG. 10. Further, the message obtaining section 20 transmits the message to the operation instruction detecting section 21.

Upon receipt of the message from the message obtaining section 20, the operation instruction detecting section 21 detects an operation instruction from the message and specifies an instruction provider of the operation instruction. That is, from the message, the operation instruction detecting section 21 detects an operation instruction for causing the cleaner robot 5 to execute "photographing" and specifies the instruction provider "Mother" (i.e., the user identifier "U002"). Then, the operation instruction detecting section 21 transmits, to the instruction provider registering section 22, an operation instruction identifier of the detected operation instruction and a user identifier of the specified instruction provider. As indicated by the command name table 31 exemplified in FIG. 6, the operation instruction "photographing" corresponds to an operation instruction identifier "CM001". Moreover, a user identifier of "Mother" is "U002". From this, the operation instruction detecting section 21 transmits the operation instruction identifier "CM001" and the user identifier "U002" to the instruction provider registering section 22.

The instruction provider registering section 22 first confirms whether or not data is already contained in the execution state management table 30. Note that, as above described, no operation is executed by the external device in accordance with a control from the agent server 1 at the time point at which the message is posted by Mother, that is, no data is contained in the execution state management table 30.

When the instruction provider registering section 22 has confirmed that no data is contained in the execution state management table 30, the instruction provider registering section 22 adds the operation instruction and the instruction provider, which have been received from the operation instruction detecting section 21, to the execution state management table 30. Specifically, the instruction provider registering section 22 adds (i) "CM001" to the operation instruction identifier field and (ii) "U002" to the user list in the execution state management table 30.

The instruction provider registering section 22, which has confirmed that no data is contained in the execution state management table 30, further (i) transmits the operation instruction, which has been detected by the operation instruction detecting section 21, to the external device control section 23 and (ii) transmits the operation instruction and the instruction provider of the operation instruction to the report message generating section 25. Specifically, the instruction provider registering section 22 transmits, to the report message generating section 25, (i) the operation instruction identifier "CM001" of the operation instruction which has been detected by the operation instruction detecting section 21, (ii) the user identifier "U002" of the member who has been specified by the operation instruction detecting section 21, and (iii) a message type "RP_START".

The report message generating section 25 reads out, from the wording template table 34 illustrated in FIG. 9, a wording which is associated with both the operation instruction identifier "CM001" and the message type "RP_START" which have been obtained from the instruction provider registering section 22. As a result, the report message generating section 25 selects "[FIRST_POSTER], OK!" as a wording for a message to be generated.

The report message generating section 25 obtains a user identifier corresponding to "FIRST_POSTER" with reference to the execution state management table 30. In this case, the report message generating section 25 obtains, as "FIRST_POSTER", the user identifier "U002" which appears first in the user list of the execution state management table 30. Then, the report message generating section 25 obtains "Mother" as a user name corresponding to the user identifier "U002" with reference to the user name table 35 illustrated in FIG. 10 so as to generate a message "Mother, OK!".

The report message displaying section 26 transmits, to the family message board server 2, the message which has been generated by the report message generating section 25 and then the message "Mother, OK!" is displayed on the family message board as a message posted by Robo (the cleaner robot 5) at 14:05.

When the instruction provider registering section 22 transmits, to the external device control section 23, the operation instruction which has been detected by the operation instruction detecting section 21, i.e., the operation instruction identifier "CM001", the external device control section 23 carries out the following process. That is, the external device control section 23 reads out, with reference to the apparatus control table 32 exemplified in FIG. 7, an apparatus control code "GET_PICTURE" which corresponds to the operation instruction identifier "CM001". Further, the external device control section 23 selects the cleaner robot 5 as an external device corresponding to the apparatus control code "GET_PICTURE". Then, the external device control section 23 transmits the apparatus control code "GET_PICTURE" to the cleaner robot 5 (actually, to the home server 3).

Upon receipt of the apparatus control code "GET_PICTURE", the cleaner robot 5 executes "photographing" and then transmits a result of "photographing" to the agent server 1 via the home server 3.

The operation result obtaining section 24 receives, from the cleaner robot 5, a result that the "photographing" has succeeded. In this case, if the cleaner robot 5 has transmitted photograph image data obtained by the "photographing", the operation result obtaining section 24 also receives the photograph image data.

Then, the operation result obtaining section 24 transmits, to the report message generating section 25, a message type "RP_SUCCEEDED", the photograph image data as a return value, and the operation instruction identifier "CM001" of the operation instruction on "photographing".

The report message generating section 25 selects, with reference to the wording template table 34 exemplified in FIG. 9, a wording based on the operation instruction identifier "CM001" and the message type "RP_SUCCEEDED". Specifically, the report message generating section 25 selects a wording "[ALL_POSTER], I took a photograph!". Further, in order to replace "ALL_POSTER" with an actual member name, the report message generating section 25 obtains user identifiers of all members contained in the user list of the execution state management table 30. In this case, the user identifier "U002" is contained in the user list of the execution state management table 30, and the report message generating section 25 obtains the user identifier "U002" so as to generate a message "Mother, I took a photograph!" with reference to the user name table 35 exemplified in FIG. 10.

In a case where the report message generating section 25 has received photograph image data, which has been taken by the "photographing" executed by the cleaner robot 5, from the operation result obtaining section 24, the photograph image data can be attached to the report message "Mother, I took a photograph!".

The report message displaying section 26 outputs the report message "Mother, I took a photograph!", which has been generated by the report message generating section 25, to the family message board server 2 so that the message is displayed on the family message board.

As a result, the report message "Mother, I took a photograph!" is displayed on the family message board as a message which was posted by Robo (i.e., the cleaner robot 5) at 14:09 (see FIG. 4). That is, the report message reporting the result of the operation "photographing" is posted on the family message board while the report message is explicitly directed to the member (i.e., Mother) who posted the message ("Take a photograph") including the operation instruction "photographing". Note that, in order to simplify the drawing, the photograph image data taken by the "photographing" executed by the cleaner robot 5 is not illustrated in FIG. 4.

Subsequently, the operation result obtaining section 24 deletes, from the execution state management table 30, (i) the operation instruction identifier "CM001" of the operation instruction "photographing" and (ii) the user identifier "U002" of the instruction provider who is associated with the operation instruction.

As such, the message which is posted on the family message board by the agent server 1 on behalf of the cleaner robot 5 explicitly indicates the destination of the message. Therefore, the members of the family can easily confirm to whom the message, which has been posted by Robo (i.e., the cleaner robot 5), is directed.

Note that a destination, which is explicitly indicated in a message posted on the family message board by the agent server 1, preferably appears at the beginning of the message as illustrated in FIG. 4. That is, the agent server 1 preferably posts, on the family message board, the message "Mother, I took a photograph!" rather than a message "I took a photograph, Mother!". By thus explicitly indicating a destination of a message at the beginning of the message, the members can easily know to whom the message is directed without reading a content of the message.

In the above description, the agent server 1 includes the storage section 12 and the instruction provider registering section 22. Note, however, that, the storage section 12 and the instruction provider registering section 22 are not essential, provided that the family message board displays one (1) report message which (i) reports a result of an operation executed by an external device in accordance with an instruction given from one (1) instruction provider and (ii) is explicitly directed to the one (1) instruction provider. In such a case, the operation instruction detecting section 21 (i) detects an operation instruction for operating the external device, (ii) specifies a member, who has posted the message, as an instruction provider of the operation instruction, and then (iii) notifies the report message generating section 25 of the instruction provider. The report message generating section 25 can generate a report message which (i) reports an operation result that has been obtained by the operation result obtaining section 24 and (ii) is explicitly directed to the instruction provider who has been specified by the operation instruction detecting section 21. From this, the agent server 1 can post, on the family message board, the report message which (i) reports a result of the operation instruction which has been detected by the operation instruction detecting section 21 and (ii) is explicitly directed to the instruction provider who has been specified by the operation instruction detecting section 21.

As above described, the agent server 1 can dynamically change a member of whom a result of an operation instruction is to be notified. That is, a destination of a report message which is to be posted to a bulletin board, in which a plurality of members can participate, can be determined depending on circumstances. More specifically, it is possible to display, on the family message board, a report message which (i) reports a result of an operation executed by an external device and (ii) is explicitly directed to a member who posted, on the family message board, a message including an operation instruction on the operation. As such, a destination of a report message for reporting a result of an operation executed by an external device is not predetermined but can be determined depending on circumstances. In particular, it is possible to explicitly indicate that the report message is directed to a member who posted, on the family message board, a message including an operation instruction on the operation. Therefore, in the communication service in which messages posted by members are displayed in a time series and a plurality of members view the messages, the members can easily confirm to whom each of the messages is directed.

Embodiment 2

The above description has discussed the example in which a message, which includes an operation instruction, and a message, which reports a result of an operation executed in accordance with the operation instruction, are exchanged between Mother and the agent server 1 on the family message board.

The following description will discuss processes executed by the agent server 1 in a case where messages including an operation instruction are posted on the family message board by a plurality of members.

As above described, the agent server 1 further includes: a storage section 12 for storing the execution state management table 30 that contains an operation instruction, which has been detected by the operation instruction detecting section 21 (operation instruction detecting means), and an instruction provider of the operation instruction, which is associated with the operation instruction, during a time period between (i) when the operation instruction is detected by the operation instruction detecting section 21 and (ii) when the cleaner robot 5 (external device) ends the operation executed in accordance with the operation instruction; and an instruction provider registering section 22 (instruction provider registering means) for judging, when an operation instruction has been detected by the operation instruction detecting section 21, whether or not the operation instruction is identical with an operation instruction which is already contained in the execution state management table 30, if the operation instructions are identical with each other, the instruction provider registering section 22 adding an instruction provider, who has been specified by the operation instruction detecting section 21, to the execution state management table 30 as an instruction provider associated with the operation instruction which is already contained in the execution state management table 30; when the operation result obtaining section 24 has obtained an operation result of the external device, the report message generating section 25 generating one (1) report message which is directed to all instruction providers who are associated, in the execution state management table 30, with an operation instruction of an operation whose result is to be reported by the one (1) report message.

In a case where a plurality of members have posted different messages including an identical operation instruction on the family message board, the agent server 1, which includes the execution state management table 30 and the instruction provider registering section 22, can cause one (1) report message, which reports a result of the operation instruction and is explicitly directed to the plurality of members, to be displayed on the family message board. More accurately, in a case where (i) the operation instruction detecting section 21 first detects an operation instruction from a message posted on the family message board by a certain member and then (ii) a message, which includes the identical operation instruction, is posted on the family message board by another member before the operation result obtaining section 24 obtains a result of an operation executed in accordance with the operation instruction, the agent server 1 can cause a report message, which reports a result of the operation instruction and is explicitly directed to the certain member and to the another member, to be displayed on the family message board.

The following description will discuss processes in which (i) messages that include an identical operation instruction are posted on the family message board by a plurality of members before an operation result of the operation instruction is obtained and then (ii) the agent server 1 posts, on the family message board, one (1) message which reports a result of the operation instruction and is explicitly directed to the plurality of members.

FIG. 11 is a view illustrating a time series of exchanging messages on the family message board between the agent server 1 and a plurality of family members.

Figure 12:
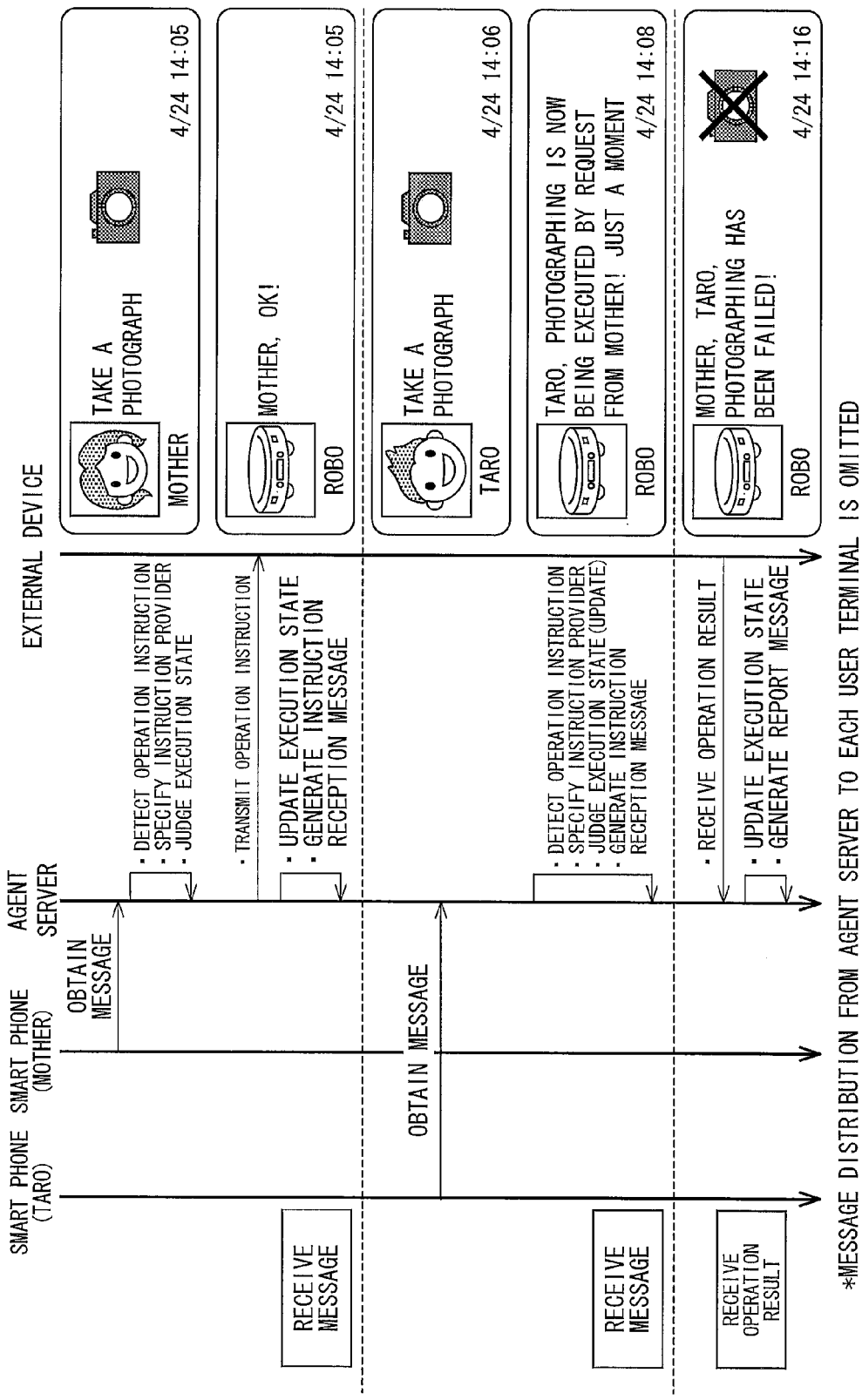
FIG. 12 is a view illustrating a time series of how the agent server of FIG. 11 exchanges messages shown in FIG. 11.

FIG. 12 is a view illustrating a time series of how the agent server 1 exchanges messages shown in FIG. 11.

Note that, in the exchanging of messages illustrated in FIGS. 11 and 12, it is assumed that no operation is executed by an external device in accordance with a control from the agent server 1 before a message "Take a photograph" is posted on the family message board by Mother with the use of the mobile terminal 4. In other words, no data is contained in the execution state management table 30 at a time point at which the message is posted by Mother.

In FIG. 11, a process carried out during a time period between (i) when Mother posts a message "Take a photograph" at 14:05 and (ii) when a message "Mother, OK!" posted by Robo is displayed on the family message board at 14:05 is identical with the process described in Embodiment 1, and is therefore not repeatedly described.

At a time point when a message "Take a photograph" is posted by Taro at 14:06, the following information is contained in the execution state management table 30 as a result of the process carried out, as described in Embodiment 1, by the agent server 1 on the message posted by Mother. That is, an operation instruction "photographing" and an instruction provider "Mother", who is associated with the operation instruction, are contained in the execution state management table 30. Specifically, in the execution state management table 30, "CM001" is contained in the operation instruction identifier field and "U002" is contained in the user list.

Moreover, it is assumed that, at the time point when Taro posts the message, the external device control section 23 has already transmitted an apparatus control code "GET_PICTURE" to the cleaner robot 5 (actually, to the home server 3) but the operation result obtaining section 24 has not yet received, from the cleaner robot 5, a result of an operation executed in accordance with the operation instruction "photographing".

In a case where Taro posts the message "Take a photograph" on the family message board at 14:06 at a time point when the operation result obtaining section 24 has not yet obtained a result of the operation executed in accordance with the operation instruction "photographing", the agent server 1 carries out the following process.

That is, first, the message obtaining section 20 obtains, from the family message board server 2, the message of Taro in the JSON format of, for example, {"poster": "U003", "text": "Take a photograph", "image_ID": " "}. Note that "U003" is a user identifier indicating "Taro". Then, the message obtaining section 20 transmits the message to the operation instruction detecting section 21.

Upon receipt of the message from the message obtaining section 20, the operation instruction detecting section 21 detects the operation instruction "photographing" (i.e., the operation instruction identifier "CM001") and specifies "Taro" (i.e., the user identifier "U003") as an instruction provider of the operation instruction. Then, the operation instruction detecting section 21 transmits the operation instruction identifier "CM001" and the user identifier "U003" to the instruction provider registering section 22.

The instruction provider registering section 22 first confirms whether or not data is already contained in the execution state management table 30. In this case, the execution state management table 30 contains, as above described, the operation instruction "photographing" (i.e., the operation instruction identifier "CM001") and "Mother" (i.e., the user identifier "U002") as an instruction provider associated with the operation instruction, at the time point when Taro posts the message. More specifically, in the execution state management table 30, "CM001" is contained in the operation instruction identifier field and "U002" is contained in the user list.

When the instruction provider registering section 22 confirms that data is already stored in the execution state management table 30, the instruction provider registering section 22 then judges whether or not the operation instruction, which has been detected by the operation instruction detecting section 21 this time, is identical with the operation instruction which is already contained in the execution state management table 30.

In this case, an operation instruction identifier of an operation instruction, which has been detected by the operation instruction detecting section 21 this time, is "CM001", and an operation instruction identifier, which is contained in the operation instruction identifier field of the execution state management table 30, is "CM001". Therefore, the instruction provider registering section 22 determines that the operation instruction, which has been detected by the operation instruction detecting section 21 this time is identical with the operation instruction which is already contained in the execution state management table 30.

The instruction provider registering section 22, which has determined that the operation instructions are identical with each other, adds the instruction provider, who has been specified by the operation instruction detecting section 21 this time, as an instruction provider who is associated with the operation instruction which is already contained in the execution state management table 30. Specifically, the instruction provider registering section 22 adds "U003" to the last of the user list in the execution state management table 30. As such, "U003" is added next to "U002" in the user list of the execution state management table 30 exemplified in FIG. 5. That is, an order of user identifiers contained in the user list of the execution state management table 30 is an order of members who posted, on the family message board, messages that include an operation instruction corresponding to an operation instruction identifier which is contained in the operation instruction identifier field.

The instruction provider registering section 22 further transmits, to the report message generating section 25, the operation instruction which has been detected by the operation instruction detecting section 21 this time, the instruction provider who has been specified this time, and a message type "RP_BUSY_1". Specifically, the instruction provider registering section 22 transmits the operation instruction identifier "CM001", the user identifier "U003", and the message type "RP_BUSY_1" to the report message generating section 25.

The report message generating section 25 reads out, from the wording template table 34 illustrated in FIG. 9, a wording which is associated with both the operation instruction identifier "CM001" and the message type "RP_BUSY_1" which have been obtained from the instruction provider registering section 22. As a result, the report message generating section 25 selects "[LAST_POSTER], [CMD_NAME] is now being executed by request from [ALL_POSTER-LAST_POSTER]! Just a moment" as a wording of a message to be generated.

The report message generating section 25 obtains user identifiers corresponding to "LAST_POSTER" and "ALL_POSTER-LAST_POSTER" with reference to the execution state management table 30. In this case, the report message generating section 25 (i) obtains, as a user identifier of "LAST_POSTER", the user identifier "U003" which is contained at the last of the user list in the execution state management table 30 and (ii) obtains, as a user identifier of "ALL_POSTER", the user identifiers "U002" and "U003" (i.e., all the user identifiers) contained in the user list of the execution state management table 30. From this, the report message generating section 25 obtains "U002" as the user identifier corresponding to "ALL_POSTER-LAST_POSTER".

Further, the report message generating section 25 obtains an operation instruction identifier corresponding to "CMD_NAME" with reference to the execution state management table 30. In this case, the report message generating section 25 obtains, as the operation instruction identifier corresponding to "CMD_NAME", the operation instruction identifier "CM001" which is contained in the operation instruction identifier field of the execution state management table 30. Then, the report message generating section 25 obtains "photographing" as an operation name corresponding to the operation instruction identifier "CM001", with reference to the command name table 31 exemplified in FIG. 6.

Further, the report message generating section 25 obtains, with reference to the user name table 35 illustrated in FIG. 10, "Mother" and "Taro" as the user names corresponding to the respective user identifiers "U002" and "U003". Furthermore, the report message generating section 25 obtains "photographing" as "CMD_NAME".

From this, the report message generating section 25 generates a message "Taro, photographing is now being executed by request from Mother! Just a moment".

The report message displaying section 26 transmits, to the family message board server 2, the message which has been generated by the report message generating section 25. As a result, "Taro, photographing is now being executed by request from Mother! Just a moment" is displayed on the family message board as a message posted by Robo (i.e., the cleaner robot 5) at 14:08.

Upon receipt of an apparatus control code "GET_PICTURE" from the external device control section 23, the cleaner robot 5 executes "photographing" and then transmits a result of "photographing" to the agent server 1 via the home server 3, as early described in Embodiment 1.

In a case where the cleaner robot 5 tried to execute "photographing" but "photographing has been failed", the cleaner robot 5 transmits an error code "1" to the agent server 1 together with the operation instruction identifier (CM001) of the operation instruction "photographing".

Upon receipt of the information from the cleaner robot 5, the operation result obtaining section 24 transmits a message type "RP_FAILED_error code" (in this case, a message type "RP_FAILED_1") and the operation instruction identifier "CM001" to the report message generating section 25.

The report message generating section 25 selects, with reference to the wording template table 34 exemplified in FIG. 9, a wording based on the operation instruction identifier "CM001" and the message type "RP_FAILED_1". Specifically, the report message generating section 25 selects a wording "[ALL_POSTER], photographing has been failed!". Moreover, in order to replace "ALL_POSTER" with an actual member name, the report message generating section 25 obtains user identifiers of all members contained in the user list of the execution state management table 30. In this case, the user identifiers "U002" and "U003" are contained in the user list of the execution state management table 30, and therefore the report message generating section 25 obtains the user identifiers "U002" and "U003" so as to generate, with reference to the user name table 35 exemplified in FIG. 10, a message "Mother, Taro, photographing has been failed!".

The report message displaying section 26 outputs, to the family message board server 2, the report message which has been generated by the report message generating section 25. As a result, "Mother, Taro, photographing has been failed!" is displayed on the family message board as a message posted by Robo (i.e., the cleaner robot 5) at 14:16 (see FIG. 11). That is, the report message, which reports a result of "photographing" and is explicitly directed to the members (i.e., Mother and Taro) who posted the messages ("Take a photograph") including the operation instruction "photographing", is posted on the family message board.

Subsequently, the operation result obtaining section 24 deletes, from the execution state management table 30, the operation instruction identifier "CM001" of the operation instruction "photographing" and the user identifiers "U002" and "U003" of the instruction providers associated with the operation instruction.

In the above description, the example is described in which both Mother and Taro post the message "Take a photograph" on the family message board. Note, however, that, even though expressions of messages posted on the family message board by Mother and Taro are different from each other, the agent server 1 can carry out the above described process provided that both the messages include the operation instruction "photographing". That is, it is possible that Mother posts a message "Take a photograph" and Taro posts a message "Photograph the room by camera". In a case where the operation instruction detecting section 21 detects the identical operation instruction "photographing" from the two messages, the agent server 1 can cause one (1) report message, which reports a result of "photographing" and is explicitly directed to Mother and Taro, to be displayed on the family message board.

As such, the message which is posted on the family message board by the agent server 1 on behalf of the cleaner robot 5 explicitly indicates the destination of the message. In a case where different messages, which include an identical operation instruction, are posted on the family message board by a plurality of members, the agent server 1 can cause one (1) report message, which reports a result of the operation instruction and is explicitly directed to the plurality of members, to be displayed on the family message board. Therefore, the agent server 1 can generate an efficient report message whose destination is explicitly indicated.

Embodiment 3

According to the agent server 1, the operation instruction detecting section 21 (operation instruction detecting means) can (i) detect the operation instruction from an image included in a message which has been posted on the family message board (communication service) by the member and (ii) specify the member, who has posted the message, as an instruction provider of the operation instruction.

Figure 13:
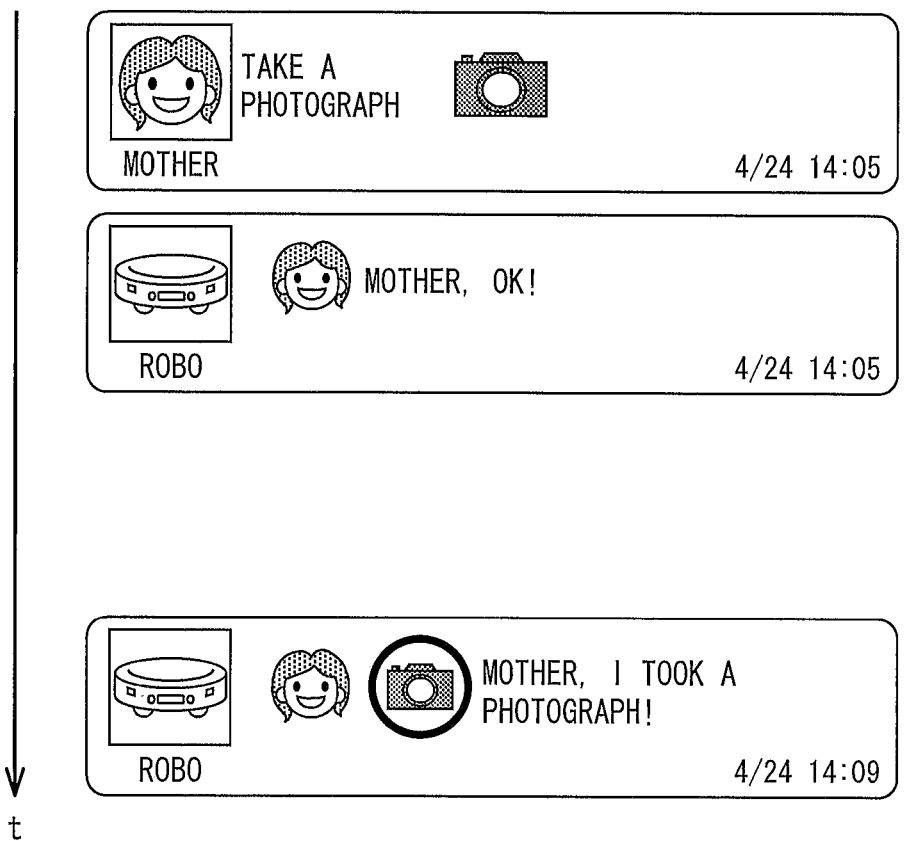
FIG. 13 is a view illustrating a time series of exchanging messages between an agent server 1 and a member in a case where an image is included in a message posted on the family message board by the member.

FIG. 13 is a view illustrating a time series of exchanging messages between the agent server 1 and a member in a case where an image is included in a message posted by the member on the family message board.

In a case where Mother has posted, on the family message board, a message "Take a photograph" and an image that implies an operation instruction "photographing" (see FIG. 13), the message obtaining section 20 obtains the message of Mother from the family message board server 2. Specifically, the message obtaining section 20 obtains, from the family message board server 2, the message in the JSON format of, for example, {"poster": "U001", "text": "Take a photograph", "image_ID": "SEAL_101"}.

Here, "image_ID" is an image ID attached to the message. The image ID is an ID for uniquely specifying an image which is incorporated in an application of the mobile terminal 4. By attaching an image ID to a message to be outputted to the family message board server 2, it is possible to output a message with an image to the family message board server 2.

The operation instruction detecting section 21 confirms whether or not a message, which has been posted by a member, includes an image ID contained in the command image table 33 exemplified in FIG. 8. In a case where an image ID contained in the command image table 33 is included in the message, the operation instruction detecting section 21 transmits, to the instruction provider registering section 22, a user identifier of the member who has posted the message and an operation instruction identifier corresponding to the image ID. Specifically, in the command image table 33 illustrated in FIG. 8, an operation instruction identifier "CM001" is associated with an image ID "SEAL_101". Therefore, the operation instruction detecting section 21 transmits the user identifier "U002" and the operation instruction identifier "CM001" to the instruction provider registering section 22.

Furthermore, in the case where an image ID contained in the command image table 33 is included in the message posted by the member, the operation instruction detecting section 21 transmits an operation instruction identifier corresponding to the image ID, i.e., the operation instruction identifier "CM001" to the external device control section 23.

Since the operation instruction detecting section 21 (operation instruction detecting means) can detect an operation instruction from an image included in a message which has been posted on the family message board by a member, the member does not need to post, on the family message board, the message which includes an "operation instruction" written in a text format. In other words, the member does not need to post a message that includes an "operation instruction" in a text format. By thus posting, on the family message board, an image which is set in advance to be recognized by the agent server 1 as a certain operation instruction, a member can cause the agent server 1 to execute the operation instruction and to post, on the family message board, a report message regarding a result of the operation instruction.

Moreover, the agent server 1 can display a destination of a report message by an image that can be identified by members (see FIG. 13). That is, the report message displaying section 26 can cause the destination of the message to be displayed on the family message board (communication service) by an image with which the member can be identified. The agent server 1 can explicitly indicate a destination of a report message by an image with which members can intuitively identify each of the members more easily than with a text. By viewing an image displayed in a message, members can recognize to whom the message is directed more easily than by reading a text in the message.

Further, the agent server 1 can cause a result of an operation, which has been executed in accordance with an operation instruction, to be displayed by an image indicating the operation result to be reported by a report message (see FIG. 13). That is, the report message displaying section 26 can cause a result of the operation to be displayed on the family message board (communication service) by an image that indicates the result of the operation. The agent server 1 can thus report a result of an instructed operation with the use of an image that allows the members to intuitively know the result of the operation more easily than by a text. By viewing an image displayed in a message, each of the members can recognize a result of an instructed operation more easily than by reading a text in the message.

Embodiment 4

In the agent server 1, the cleaner robot 5 (external device) controls an operation of another device (e.g., an air conditioner 6), and the operation instruction detecting section 21 detects an operation instruction for causing the cleaner robot 5 to control an operation of the another device.

Figure 14:
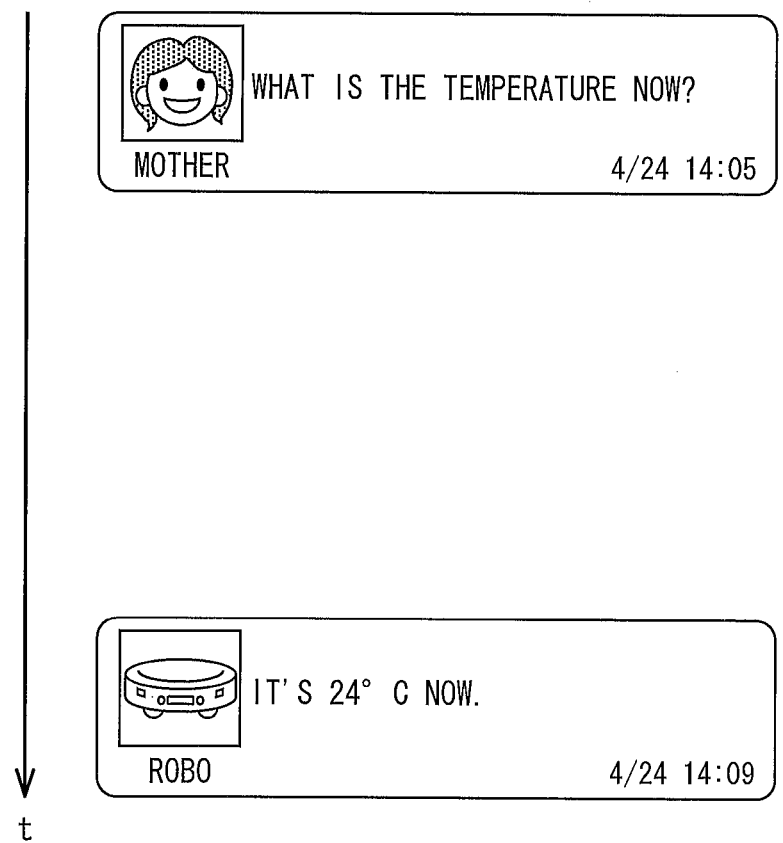
FIG. 14 is a view illustrating a time series of exchanging messages between an agent server and a member in a case where the agent server posts, on the family message board, an operation result of an apparatus which has been controlled by an external device.

FIG. 14 is a view illustrating a time series of exchanging messages between the agent server 1 and a member in a case where the agent server 1 posts, on the family message board, an operation result of an apparatus which has been controlled by an external device.

The operation instruction detecting section 21 detects, from a message "What is the temperature now?" posted on the family message board by Mother, an operation instruction to the cleaner robot 5 on "causing air conditioner 6 to detect room temperature". Specifically, the operation instruction detecting section 21 detects an operation instruction on "obtaining temperature" (i.e., an operation instruction identifier "CM003") and transmits the operation instruction (i.e., the operation instruction identifier "CM003") to the external device control section 23. The operation instruction detecting section 21 further specifies a user identifier "U002" of the instruction provider.

With reference to the apparatus control table 32 exemplified in FIG. 6, the external device control section 23 transmits, to the cleaner robot 5, an apparatus control code "GET_TEMPERATURE" as an operation instruction corresponding to the operation instruction identifier "CM003", i.e., as the operation instruction on "causing air conditioner 6 to detect room temperature" given to the cleaner robot 5.

Upon receipt of the apparatus control code "GET_TEMPERATURE", the cleaner robot 5 controls the air conditioner 6 to detect a room temperature. The air conditioner 6 includes a temperature sensor, and transmits a room temperature, which has been detected by the temperature sensor in accordance with the control from the cleaner robot 5, to the agent server 1 via the home server 3.

The operation result obtaining section 24 receives (i) an operation result that "obtaining temperature" has succeeded and (ii) a room temperature "24° C." which has been obtained by "obtaining temperature".

The operation result obtaining section 24 then transmits, to the report message generating section 25, a message type "RP_SUCCEEDED", the room temperature "24° C." as a return value, and an operation instruction identifier "CM003" of the operation instruction "obtaining temperature".

With reference to the wording template table 34 exemplified in FIG. 9, the report message generating section 25 selects a wording based on the operation instruction identifier "CM003" and the message type "RP_SUCCEEDED". Specifically, the report message generating section 25 selects a wording "It's [RETURN_VAL]° C. now".

The report message generating section 25 inserts the room temperature "24° C.", which has been obtained from the operation result obtaining section 24 as the return value, into the wording so as to generate a report message "It's 24° C. now".

In this case, no explicit destination of the report message "It's [RETURN_VAL]° C. now" is indicated. Note, however, that it is possible to explicitly indicate a destination of the report message "It's [RETURN_VAL]° C. now" by changing a content of the wording contained in the wording template table 34.

The report message displaying section 26 outputs the report message "It's 24° C. now", which has been generated by the report message generating section 25, to the family message board server 2 so that the message is displayed on the family message board.

As a result, the report message "It's 24° C. now" is displayed on the family message board as a message posted by Robo (i.e., the cleaner robot 5) at 14:09 (see FIG. 14).

Subsequently, the operation result obtaining section 24 deletes, from the execution state management table 30, the operation instruction identifier "CM003" of the operation instruction "obtaining temperature" and the user identifier "U002" of the instruction provider who is associated with the operation instruction.

As above described, the agent server 1 allows a display of not only a report message reporting an instructed operation result which has been directly obtained by the operation of an external device itself but also a report message reporting an instructed operation result which has been obtained by causing an external device to control the operation of another device.

Modification Example

According to the example above described, the agent server 1 is configured to make a comment on behalf of the cleaner robot 5. Alternatively, it is possible that (i) the other household appliances, which are provided in the house, are dealt with as respective personified appliances and (ii) the agent server 1 makes comments on behalf of such household appliances. For example, in a case where the information source is refrigerator stock information and the agent server 1 makes a comment regarding an event of a refrigerator 8, the agent server 1 can output a comment message as a character of the refrigerator 8.

Each functional block for the agent server 1 to process a message can be provided in each of the personified appliances (e.g., the cleaner robot 5). In such a case, it is possible to employ a configuration in which the family message board server 2 accepts messages from the personified appliances as if the messages are posted on the family message board by characters of the respective personified appliances.

In the example above described, the family message board is employed as the communication service in which messages posted by members are displayed in a time series. Note, however, that the communication service is not limited to a particular one provided that messages posted by members are displayed in a time series, and a thread can be displayed which is made up of chat messages or of e-mail messages arranged in a time series.

The agent server 1 described above indicates (i) a logical combination of a plurality of functional modules for carrying out specific functions or (ii) a logical combination of a plurality of devices for carrying out specific functions, and it is not important whether or not the functional modules or the devices are provided in a single housing.

The functional modules (functional blocks) for serving as the agent server 1 and storage sections such as the execution state management table 30, the command name table 31, the apparatus control table 32, the command image table 33, the wording template table 34, and the user name table 35 can be configured by cloud computing.

Embodiment 5

Control blocks of the agent server 1 (particularly, the operation instruction detecting section 21, the instruction provider registering section 22, the external device control section 23, the operation result obtaining section 24, the report message generating section 25, the report message displaying section 26) may be realized by a logic circuit (hardware) provided in an integrated circuit (IC chip) or the like or may be realized by software as executed by a CPU (Central Processing Unit).

In the latter case, the agent server 1 includes: a CPU that executes instructions of a program that is software realizing the foregoing functions; ROM (Read Only Memory) or a storage device (each referred to as "storage medium") storing the program and various kinds of data in such a form that they are readable by a computer (or a CPU); and RAM (Random Access Memory) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be supplied to or made available to the computer via any transmission medium (such as a communication network and a broadcast wave) which enables transmission of the program. Note that the present invention can also be implemented by the program in the form of a computer data signal embedded in a carrier wave which is embodied by electronic transmission.

[Main Points]

The message notifying device (agent server 1) in accordance with an aspect 1 of the present invention includes: operation instruction detecting means (operation instruction detecting section 21) for (i) detecting an operation instruction, based on which an external device is operated, from a message in a communication service (family message board) that displays, in a time series, messages which have been posted by members and (ii) specifies, as an instruction provider of the operation instruction, a member who has posted the message; external device control means (instruction provider registering section 22) for controlling the external device in accordance with the operation instruction which has been detected by the operation instruction detecting means; operation result obtaining means (external device control section 23) for obtaining a result of an operation executed by the external device in accordance with a control from the external device control means; report message generating means (report message generating section 25) for generating a report message for reporting an operation result which has been obtained by the operation result obtaining means; and report message displaying means (report message displaying section 26) for outputting the report message, which has been generated by the report message generating means, to a server, which provides the communication service, so that the communication service displays the report message which is explicitly directed to the instruction provider who has been specified by the operation instruction detecting means.

The method in accordance with an aspect 7 of the present invention is a method for controlling a message notifying device and includes the steps of: (a) detecting an operation instruction, based on which an external device is operated, from a message in a communication service that displays, in a time series, messages which have been posted by members, and specifying, as an instruction provider of the operation instruction, a member who has posted the message (S001); (b) controlling the external device in accordance with the operation instruction which has been detected in the step (a) (S004); (c) obtaining a result of an operation executed by the external device in accordance with a control in the step (b) (S006); (d) generating a report message for reporting an operation result which has been obtained in the step (c) (S007); and (e) outputting the report message, which has been generated in the step (d), to a server, which provides the communication service, so that the communication service displays the report message which is explicitly directed to the instruction provider who has been specified in the step (a) (S007).

According to the configuration of the message notifying device and the method in accordance with an aspect of the present invention, it is possible to bring about an effect of notifying a user, who is participating in a communication (e.g., a family message board) in which at least one user participates, of a message which (i) reports a result of an operation instruction given from the user and (ii) is explicitly directed to the user.

The message notifying device in accordance with an aspect 2 of the present invention further includes, in addition to the aspect 1: a storage section (storage section 12, in particular, execution state management table 30) for storing an operation instruction, which has been detected by the operation instruction detecting means, and an instruction provider of the operation instruction, which is associated with the operation instruction, during a time period between (i) when the operation instruction is detected and (ii) when the external device ends the operation executed in accordance with the operation instruction; and instruction provider registering means (instruction provider registering section 22) for judging, when an operation instruction has been detected by the operation instruction detecting means, whether or not the operation instruction is identical with an operation instruction which is already stored in the storage section, if the operation instructions are identical with each other, the instruction provider registering means adding an instruction provider, who has been specified by the operation instruction detecting means, to the storage section as an instruction provider associated with the operation instruction which is already stored in the storage section; when the operation result obtaining means has obtained an operation result of the external device, the report message generating means generating one (1) report message which is directed to all instruction providers who are associated, in the storage section, with an operation instruction of an operation whose result is to be reported by the one (1) report message.

According to the configuration, in a case where different messages, which include an identical operation instruction, are posted on the family message board by a plurality of members before the external device ends an operation executed in accordance with the operation instruction, one (1) report message, which reports a result of the operation instruction and is explicitly directed to the plurality of members, can be displayed on the family message board. Therefore, the agent server 1 can generate an efficient report message whose destination is explicitly indicated.

According to the message notifying device in accordance with an aspect 3 of the present invention, in the aspect 1 or 2, it is preferable that the operation instruction detecting means detects an operation instruction from an image included in a message which has been posted on the communication service by a member and specifies, as an instruction provider of the operation instruction, the member who has posted the message.

According to the configuration, the operation instruction detecting means can detect the operation instruction from the image included in the message posted on the family message board by the member. Therefore, the member does not need to post a message, which includes an "operation instruction", on the family message board in a text format. In other words, the member does not need to post a message that includes an "operation instruction" in a text format.

With the configuration, by posting, on the family message board, an image which is set in advance to be recognized by the agent server 1 as a certain operation instruction, a member can cause the agent server 1 to execute the operation instruction and to post, on the family message board, a report message regarding a result of the operation instruction.

According to the message notifying device in accordance with an aspect 4 of the present invention, in any of the aspects 1 through 3, it is preferable that the report message displaying means causes the communication service to display the report message with an image so that the communication service shows that the report message is explicitly directed to the member as the instruction provider, the image being an image with which the member can be identified.

According to the configuration, the agent server 1 can explicitly indicate a destination of a report message by an image with which members can intuitively identify each of the members more easily than with a text. By viewing an image displayed in a message, members can recognize to whom the message is directed more easily than by reading a text in the message.

According to the message notifying device in accordance with an aspect 5 of the present invention, in any of the aspects 1 through 4, it is preferable that the report message displaying means causes the communication service to display the report message with an image that indicates the result of the operation.

According to the configuration, the agent server 1 can report a result of an instructed operation with the use of an image that allows the members to intuitively know the result of the operation more easily than by a text. By viewing an image displayed in a message, each of the members can recognize a result of an instructed operation more easily than by reading a text in the message.

According to the message notifying device in accordance with an aspect 6 of the present invention, in any of the aspects 1 through 5, it is preferable that the external device controls an operation of another device; and the operation instruction detecting means detects an operation instruction for causing the external device to control the operation of the another device.

According to the configuration, it is possible to display not only a report message reporting an instructed operation result which has been directly obtained by the operation of an external device itself but also a report message reporting an instructed operation result which has been obtained by causing the external device to control the operation of the another device.

Note that the message notifying device may be realized by a computer. In this case, the present invention encompasses: a control program for the message notifying device which program causes a computer to operate as the foregoing means of the message notifying device so that the message notifying device can be realized by the computer; and a computer-readable storage medium storing the control program therein.

The present invention is not limited to the embodiments, but can be altered by a skilled person in the art within the scope of the claims. An embodiment derived from a proper combination of technical means disclosed in respective different embodiments is also encompassed in the technical scope of the present invention. Further, it is possible to form a new technical feature by combining the technical means disclosed in the respective embodiments.

INDUSTRIAL APPLICABILITY

The message notifying device of the present invention can be widely applied to various communication systems that can notify, with the use of an electronic conversation tool, members of a message regarding an operation result of an external device.

REFERENCE SIGNS LIST

1: Agent server (message notifying device)
2: Family message board server (communication service providing server/external device)
3: Home server (external device)
3a: Information supplying server (external device)
4a through 4c: Mobile terminal (communication terminal device)
5: Cleaner robot (personified appliance/external device)
6: Air conditioner (external device)
7: Lighting device (external device)
8: Refrigerator (external device)
9: PC (external device)
10: Control section
11: Communication section
12: Storage section
21: Operation instruction detecting section (operation instruction detecting means)
22: Instruction provider registering section (instruction provider registering means)
23: External device control section (external device control means)
24: Operation result obtaining section (operation result obtaining means)
25: Report message generating section (report message generating means)
26: Report message displaying section (report message displaying means)
30: Execution state management table
100: Family message board system (communication system)

The invention claimed is:
1. A message notifying device comprising:
a memory; and
a central processing unit (CPU) configured to:
(i) detect an operation instruction, based on which an external device is operated, from a message in a communication service that displays, in a time series, messages which have been posted by members and (ii) specify, as an instruction provider of the operation instruction, the member who has posted the message;
control the external device in accordance with the operation instruction which has been detected by the CPU;
obtain a result of an operation executed by the external device in accordance with a control from the CPU;
generate a report message for reporting an operation result which has been obtained by the CPU; and
output the report message, which has been generated by the CPU, to a server, which provides the communication service, so that the communication service, which is displaying, in the time series, the message which have been posted by the members, displays, in the time series, the report message which is explicitly directed to the instruction provider who has been specified by the CPU;
the external device being other than the member's communication terminal device or the message notifying device, the operation instruction having been posted by the member from the member's communication terminal device,
wherein the CPU is further configured to detect an operation instruction from an image included in a message which has been posted on the communication service by a member and specify, as an instruction provider of the operation instruction, the member who has posted the message.

2. A message notifying device as set forth in claim 1, further comprising:
a storage section for storing an operation instruction, which has been detected by the CPU, and an instruction provider of the operation instruction, which is associated with the operation instruction, during a time period between (i) when the operation instruction is detected and (ii) when the external device ends the operation executed in accordance with the operation instruction; and
wherein the CPU is further configured to
judge, when an operation instruction has been detected by the CPU, whether or not the operation instruction is identical with an operation instruction which is already stored in the storage section,
and, if the operation instructions are identical with each other, the instruction provider, who has been specified by the CPU, to the storage section as an instruction provider associated with the operation instruction which is already stored in the storage section, and
generate, when the CPU has obtained an operation result of the external device, one (1) report message which is directed to all instruction providers who are associated, in the storage section, with an operation instruction of an operation whose result is to be reported by the one (1) report message.

3. The message notifying device as set forth in claim 1, wherein:
the CPU is further configured to cause the communication service to display the report message with an image so that the communication service shows that the report message is explicitly directed to the member as the instruction provider, the image being an image with which the member can be identified.

4. The message notifying device as set forth in claim 1, wherein:
the CPU is further configured to cause the communication service to display the report message with an image that indicates the result of the operation.

5. The message notifying device as set forth in claim 1, wherein:
the external device controls an operation of another device; and
the CPU is further configured to detect an operation instruction for causing the external device to control the operation of the another device.

6. The message notifying device as set forth in claim 1, wherein:
the external device is placed in a space shared by members of a community.

7. The message notifying device as set forth in claim 1, wherein:
the external device is a cleaner robot.

8. A method for controlling a message notifying device, said method comprising the steps of:
(a) detecting an operation instruction, based on which an external device is operated, from a message in a communication service that displays, in a time series, messages which have been posted by members, and specifying, as an instruction provider of the operation instruction, the member who has posted the message;
(b) controlling the external device in accordance with the operation instruction which has been detected in the step (a);
(c) obtaining a result of an operation executed by the external device in accordance with a control in the step (b);
(d) generating a report message for reporting an operation result which has been obtained in the step (c); and
(e) outputting the report message, which has been generated in the step (d), to a server, which provides the communication service, so that the communication service, which is displaying, in the time series, the messages which have been posted by the members, displays, in the time series, the report message which is explicitly directed to the instruction provider who has been specified in the step (a),
the external device being other than the member's communication terminal device or the message notifying device, the operation instruction having been posted by the member from the member's communication terminal device, wherein the method further comprises detecting an operation instruction from an image included in a message which has been posted on the communication service by a member and specify, as an instruction provider of the operation instruction, the member who has posted the message.

9. A non-transitory computer readable storage medium in which a control program for causing a computer to serve as a message notifying device is stored, the control program causing the computer to execute each of the steps of:
(a) detecting an operation instruction, based on which an external device is operated, from a message in a communication service that displays, in a time series, messages which have been posted by members, and specifying, as an instruction provider of the operation instruction, the member who has posted the message;
(b) controlling the external device in accordance with the operation instruction which has been detected in the step (a);
(c) obtaining a result of an operation executed by the external device in accordance with a control in the step (b);
(d) generating a report message for reporting an operation result which has been obtained in the step (c); and
(e) outputting the report message, which has been generated in the step (d), to a server, which provides the communication service, so that the communication service, which is displaying, in the time series, the messages which have been posted by the members, displays, in the time series, the report message which is explicitly directed to the instruction provider who has been specified in the step (a),
the external device being other than the member's communication terminal device or the message notifying device,
the operation instruction having been posted by the member from the member's communication terminal device, wherein the control program further causes the computer to execute detecting an operation instruction from an image included in a message which has been posted on the communication service by a member and specify, as an instruction provider of the operation instruction, the member who has posted the message.

* * * * *